United States Patent
Izuhara et al.

(10) Patent No.: US 9,685,674 B2
(45) Date of Patent: Jun. 20, 2017

(54) POLYMER ELECTROLYTE COMPOSITION, AND POLYMER ELECTROLYTE MEMBRANE, MEMBRANE ELECTRODE ASSEMBLY AND SOLID POLYMER FUEL CELL EACH USING SAME

(71) Applicant: TORAY INDUSTRIES, INC., Tokyo (JP)

(72) Inventors: Daisuke Izuhara, Shiga (JP); Tomoyuki Kunita, Shiga (JP); Yuka Yachi, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 463 days.

(21) Appl. No.: 14/367,139

(22) PCT Filed: Dec. 14, 2012

(86) PCT No.: PCT/JP2012/082529
§ 371 (c)(1),
(2) Date: Jun. 19, 2014

(87) PCT Pub. No.: WO2013/094538
PCT Pub. Date: Jun. 27, 2013

(65) Prior Publication Data
US 2014/0377686 A1    Dec. 25, 2014

(30) Foreign Application Priority Data
Dec. 20, 2011 (JP) ................. 2011-277971

(51) Int. Cl.
| | |
|---|---|
| H01M 8/1048 | (2016.01) |
| C08K 5/5337 | (2006.01) |
| C08J 5/22 | (2006.01) |
| H01B 1/22 | (2006.01) |
| H01B 1/12 | (2006.01) |
| H01M 8/1025 | (2016.01) |
| H01M 8/1051 | (2016.01) |
| H01M 8/1018 | (2016.01) |

(52) U.S. Cl.
CPC ......... *H01M 8/1048* (2013.01); *C08J 5/2256* (2013.01); *C08K 5/5337* (2013.01); *H01B 1/122* (2013.01); *H01B 1/22* (2013.01); *H01M 8/1025* (2013.01); *H01M 8/1051* (2013.01); *C08J 2371/12* (2013.01); *H01M 2008/1095* (2013.01)

(58) Field of Classification Search
None
See application file for complete search history.

(56) References Cited

U.S. PATENT DOCUMENTS

2005/0221135 A1* 10/2005 Cooray ................ B01D 67/009
429/494

FOREIGN PATENT DOCUMENTS

| JP | 08-053614 | | 2/1996 |
|---|---|---|---|
| JP | 08053614 A | * | 2/1996 |
| JP | 2003-151346 | | 5/2003 |
| JP | 2004-134294 | | 4/2004 |
| JP | 2005-213325 | | 8/2005 |
| JP | 2009-280654 | | 12/2009 |
| WO | WO 2012/039236 | | 3/2012 |

* cited by examiner

*Primary Examiner* — Basia Ridley
*Assistant Examiner* — Heng Chan
(74) *Attorney, Agent, or Firm* — Pillsbury Winthrop Shaw Pittman LLP

(57) ABSTRACT

Provided are: a practically excellent polymer electrolyte composition having excellent chemical stability of being resistant to strong oxidizing atmosphere during operation of fuel cell, and achieving excellent proton conductivity under low-humidification conditions, excellent mechanical strength and physical durability; a polymer electrolyte membrane, a membrane electrode assembly, and a polymer electrolyte fuel cell each using the same. The polymer electrolyte composition of the present invention comprises at least an ionic group-containing polymer (A) and a phosphorus-containing additive (B), the phosphorus-containing additive (B) being at least one of a phosphine compound and a phosphinite compound. The polymer electrolyte membrane, the membrane electrode assembly, and the polymer electrolyte fuel cell of the present invention are structured by the polymer electrolyte composition.

19 Claims, No Drawings

POLYMER ELECTROLYTE COMPOSITION, AND POLYMER ELECTROLYTE MEMBRANE, MEMBRANE ELECTRODE ASSEMBLY AND SOLID POLYMER FUEL CELL EACH USING SAME

CROSS-REFERENCE TO RELATED APPLICATIONS

The present application is the U.S. national stage application corresponding to International Patent Application No. PCT/JP2012/082529, filed Dec. 14, 2012, which claims priority to Japanese Patent Application No. 2011-277971, filed Dec. 20, 2011, the entire contents of which are incorporated herein by reference.

TECHNICAL FIELD

The present invention relates to a polymer electrolyte composition, specifically a highly practically applicable polymer electrolyte composition having excellent chemical stability of being resistant to a strong oxidizing atmosphere during operation of fuel cell, and achieving excellent proton conductivity under low-humidification conditions, excellent mechanical strength and physical durability, and relates to a polymer electrolyte membrane, a membrane electrode assembly, and a polymer electrolyte fuel cell each using the same.

BACKGROUND ART

Fuel cells are a kind of power generator which extracts electric energy through electrochemical oxidation of fuels such as hydrogen and methanol. In recent years, the fuel cells have drawn attention as a clean energy supply source. Among fuel cells, polymer electrolyte fuel cell is operated at a low standard working temperature of approximately 100° C., and provides high energy density, and thus the polymer electrolyte fuel cell is expected to be widely applied as relatively small-scale distributed power facilities and as mobile power generator on automobile, ship, and the like. In addition, the polymer electrolyte fuel cell also draws attention as power source of small-scale mobile apparatus and portable apparatus, and is expected to be mounted on cell phone, personal computer, and the like in place of secondary battery such as nickel-hydrogen battery and lithium-ion battery.

A normal fuel cell is constituted by cell units, the cell unit having a configuration of a membrane electrode assembly (hereinafter referred to also as MEA) being sandwiched between separators, which MEA is constituted by an anode electrode and a cathode electrode in which a reaction of power generation occurs, and by a polymer electrolyte membrane serving as a proton conductor between the anode and the cathode. Although the main component of the polymer electrolyte membrane is an ionic group-containing polymer, (polymer electrolyte material), there can also be used a polymer electrolyte composition containing an additive and the like in order to increase the durability. The polymer electrolyte composition is also suitable for the binder and the like of the electrode catalyst layer being used in a specifically severe oxidizing atmosphere. The characteristics required of the polymer electrolyte membrane and the polymer electrolyte composition include, first, high proton conductivity, specifically high proton conductivity even under high temperature and low-humidification conditions. Since the polymer electrolyte membrane and the polymer electrolyte composition also function as the barrier that prevents direct reaction between fuel and oxygen, low permeability of fuel is required. Other necessary characteristics include chemical stability for withstanding strong oxidizing atmosphere during operation of fuel cell, mechanical strength and physical durability of being capable of withstanding thinning of membrane and repeated swell-drying cycles.

Conventionally, as the polymer electrolyte membranes, there is widely used Nafion (registered trade name, manufactured by DuPont) which is a perfluoro-sulfonate-based polymer. Since Nafion (registered trademark) is manufactured through multistage synthesis, it has a problem of extremely expensive and large fuel-crossover (transmission amount of fuel). In addition, as to Nafion, there were pointed out a problem of losing membrane mechanical strength and physical durability by swelling-drying, a problem in which the use at high temperatures is not possible because of low softening point, a problem of waste disposal after use, and further an issue of difficulty in recycling the material. The development of hydrocarbon-based electrolyte membranes has been actively conducted in recent years as a polymer electrolyte membrane having excellent membrane characteristics at a low price and being capable of substituting Nafion (registered trademark).

However, these polymer electrolyte membranes have a problem of insufficient chemical stability in the case of the use of polymer electrolyte fuel cells. Although the mechanism of chemical deterioration has not fully been clarified, hydrogen peroxide and hydroxy radical, generated during power generation, break the polymer chain and the side chain, resulting in thinning and weakening of the polymer electrolyte membrane. In addition, during repeated swelling and shrinking in association with changes in humidity, there has been a problem in which the weakened polymer electrolyte membrane breaks and thus power generation does not become possible.

In the above situation, there have been conducting studies to improve the chemical stability and improve the durability by using a polymer electrolyte composition applying perfluoro-based electrolyte membrane and hydrocarbon-based electrolyte membrane each containing antioxidant.

For example, Patent Literatures 1 and 2 propose polymer electrolyte compositions adding an antioxidant such as phosphorous acid ester (phosphite), thioether, hindered amine, and hindered phenol to a sulfonic acid group-containing polyethersulfone-based polymer or a sulfonic acid group-containing polyarylene-based polymer. Patent Literature 3 provides a polymer electrolyte composition adding a phosphorous acid ester (phosphite)-based antioxidant to a sulfonic acid group-containing polyethersulfone-based polymer.

Furthermore, Patent Literature 4 proposes a polymer electrolyte composition adding a phosphonic acid group-containing polymer such as polyvinylphosphonic acid to a sulfonic acid group-containing polyethersulfone-based polymer or a sulfonic acid group-containing polyetherketone-based polymer.

In addition, Patent Literature 5 proposes a polymer electrolyte composition adding cerium ion or manganese ion to a perfluoro sulfonic acid-based polymer and a sulfonic acid group-containing polyetherketone-based polymer.

CITATION LIST

Patent Literature

Patent Literature 1: Japanese Patent Laid-Open No. 2007-66882
Patent Literature 2: Japanese Patent Laid-Open No. 2005-213325
Patent Literature 3: Japanese Patent Laid-Open No. 2003-151346

Patent Literature 4: Japanese Patent Laid-Open No. 2000-11756

Patent Literature 5: Japanese Patent Laid-Open No. 2006-99999

SUMMARY OF INVENTION

Technical Problem

However, the polymer electrolyte compositions described in Patent Literatures 1 to 4 only add an antioxidant which is ordinarily applied to plastics materials, and they cannot obtain satisfactory chemical stability and durability because the antioxidant has high hydrophilicity and induces elution thereof outside the membrane during operation of fuel cell to thereby fail in maintaining the effects, because of the hydrolysis under strong acidity to thereby change the phosphite into phosphoric acid and phosphorous acid, because of excessive amount of oxygen, and because of other causes.

Furthermore, in Patent Literature 5, there are problems of deterioration of proton conductivity of the polymer electrolyte composition and insufficient solution membrane-forming ability caused by ion cross-linking, because the sulfonic acid group is ion-exchanged by cerium ion and manganese ion.

As described above, the polymer electrolyte compositions according to prior art are insufficient as the means for improving economy, processability, proton conductivity, mechanical strength, chemical stability, and physical durability, thus they cannot serve as industrially useful polymer electrolyte compositions.

Responding to the background of related art, the present invention provides a highly practically applicable polymer electrolyte composition having excellent chemical stability of being able to be resistant to a strong oxidizing atmosphere during operation of fuel cell, and being capable of achieving excellent proton conductivity under low-humidification conditions, excellent mechanical strength and physical durability, and provides a polymer electrolyte membrane, a membrane electrode assembly, and a polymer electrolyte fuel cell each using the same.

Solution to Problem

To solve the problems described above, the present invention adopts the following means. That is, the polymer electrolyte composition according to the present invention includes at least an ionic group-containing polymer (A) and a phosphorus-containing additive (B), the phosphorus-containing additive (B) being at least one kind selected from a phosphine compound and a phosphinite compound. Furthermore, the polymer electrolyte membrane, the membrane electrode assembly, and the polymer electrolyte fuel cell, according to the present invention, are structured by the above polymer electrolyte composition.

Advantageous Effects of Invention

The present invention can provide a practically excellent polymer electrolyte composition allowing suppression of elution of an additive even under a strong acid atmosphere during operation of fuel cell, having excellent chemical stability of being able to be resistant to a strong oxidizing atmosphere, and being capable of achieving excellent proton conductivity under low-humidification conditions, excellent mechanical strength and physical durability, and can provide a polymer electrolyte membrane, a membrane electrode assembly, and a polymer electrolyte fuel cell each using the same.

DESCRIPTION OF EMBODIMENTS

Hereinafter, the present invention will be described in detail.

The present inventors have conducted detail study on the polymer electrolyte membrane in fuel cell and the like in order to solve the above problems, and have found out that the addition of (B) a special phosphorus-containing additive to (A) an ionic group-containing polymer makes it possible to cause a polymer electrolyte composition, specifically a polymer electrolyte membrane for fuel cell, to express excellent performances in proton conductivity and power generation characteristics also under low-humidification conditions, processability such as membrane-forming, chemical stability such as oxidation resistance, radical resistance, and hydrolysis resistance, and physical durability such as mechanical strength of membrane and hot water resistance, and makes it possible to solve the above problems once and for all. Through further various examinations, the inventors have completed the present invention.

That is, the polymer electrolyte composition according to the present invention contains at least an ionic group-containing polymer (A) and a phosphorus-containing additive (B), wherein the phosphorus-containing additive (B) is at least one kind selected from a phosphine compound and a phosphinite compound.

Here, the phosphorus-containing additive used in the present invention will be described. In the present invention, the phosphine compound is defined as a compound represented by the general formula $PR_2$, the phosphinite compound is defined as a compound represented by the general formula $PR_2(OR)$, the phosphonite compound is defined as a compound represented by the general formula $PR(OR)_2$, and the phosphite (phosphorous acid ester) is defined as a compound represented by the general formula $P(OR)_3$, (R is an organic group).

There are cases where these trivalent phosphorus-containing compounds are oxidized, during operation of fuel cell, into the respective pentavalent phosphorus oxide-containing compounds: the phosphine compound being oxidized into a phosphine oxide compound represented by the general formula $O=PR_3$; the phosphinite compound being oxidized into a phosphinate compound represented by the general formula $O=PR_2(OR)$; the phosphonite compound being oxidized into a phosphonate compound represented by the general formula $O=PR(OR)_2$, and the phosphite (phosphorous acid ester) being oxidized into a phosphate (phosphoric acid) compound represented by the general formula $O=P(OR)_3$.

The phosphorus-containing additive (B) used in the polymer electrolyte composition of the present invention is required to be at least one kind selected from a phosphine compound and a phosphinite compound because of difficulty in being hydrolyzed even in a strong acidic aqueous solution such as that of sulfonic acid group, and because of being more hydrophobic and being excellent in hot water resistance, and is more preferably a phosphine compound. On the other hand, a phosphonite compound and a phosphite compound as conventional materials are originally hydrophilic and inferior in the hot water resistance, and when oxidized or hydrolyzed, they become more hydrophilic, and thus they cannot maintain the effect during operation of fuel cell, thereby failing to attain sufficient chemical stability and durability.

In the present invention, the "additive" mainly means an antioxidant, and the term is defined as a compound having at least one of the functions described in, for example, "Polymer Additives Handbook" pp. 6-77, 2010, CMC Publishing Co., Ltd.: a function as "radical chain initiation inhibitor (metal inactivator)" which inactivates metallic ion (such as $Fe^{2+}$ and $Cu^{2+}$) functioning as the catalyst to generate hydroxy radical and peroxide radical, thus hindering the initiation of chain reaction by the radicals; a function as "radical scavenger" which inactivates the generated hydroxy radical and peroxide radical to suppress the chain reaction by hydroxy radical and peroxide radical; and a function as "peroxide decomposer" which hinders the reaction of decomposition of hydrogen peroxide to become radical. The antioxidant may be any of low-molecular-weight type having a molecular weight of smaller than 2,000, and high-molecular-weight type having a molecular weight of 2,000 or larger. From the viewpoint of elution resistance, high-molecular-weight type is preferable, and the arbitrary selection is possible in consideration of the cost.

As antioxidants having the above functions, there are reported various compounds such as phosphite, thioether, hindered amine, and hindered phenol. Among them, according to the present invention, by using at least one kind selected from a phosphine compound and a phosphinite compound as the phosphorus-containing additive (B), the effect can be maintained without elution outside the membrane during operation of fuel cell, and excellent chemical stability and durability can be achieved.

Although the mechanism of improving the durability in the present invention has not fully been clarified, it is known that the trivalent phosphorus atom in a phosphine compound and the like is oxidized into pentavalent phosphorus oxide, and thus the phosphine compound not only functions as the peroxide decomposer but also has stronger coordinating power as a ligand to give electron-donating ability than that of phosphite, (for example, refer to "Palladium Reagent and Catalyst" p. 4, Wiley & Sons, Inc.) The present inventors consider that the phosphine compound functions also as the metal inactivator by coordinating to the metal ion (such as $Fe^{2+}$ and $Cu^{2+}$) to thereby inactivate them.

Next, preferable specific examples of the phosphorus-containing additive (B) used in the present invention will be described below. The polymer electrolyte composition of the present invention exhibits excellent chemical stability and durability as a polymer electrolyte membrane by adding the phosphorus-containing additive (B) to the ionic group-containing polymer (A).

The specific examples of the phosphorus-containing additive (B) used in the present invention can include, by taking a phosphine compound as an example, a phosphine compound represented by the general formula (C1), a phosphine compound containing a total of two phosphine groups represented by the general formula (C2) (bidentate phosphine compound), a phosphine compound containing a total of three phosphine groups represented by the general formula (C3) (tridentate phosphine compound), and a phosphine compound containing a total of four tetradentate phosphine groups represented by the general formula (C4) (tetradentate phosphine compound).

[Chemical formula 1]

where, in the general formula (C1), $R_1$ to $R_3$ are each a hydrocarbon group having a straight chain, a cyclic, or a branched structure, represented by the general formula of $C_mH_n$ (m and n signify integer), or a halogen atom such as fluorine, chlorine, and bromine, or a hydrogen atom; $R_1$ to $R_3$ may be the same as each other or different from each other; $R_1$ to $R_3$ may arbitrarily bind to form a cyclic structure as represented by the general formula (C1a)

[Chemical formula 2]

where, in the general formula (C2), $R_4$ to $R_7$ are each a hydrocarbon group having a straight chain, a cyclic, or a branched structure, represented by the general formula of $C_mH_n$ (m and n signify integer), or halogen atom such as fluorine, chlorine, and bromine, or a hydrogen atom; $Z_1$ is a hydrocarbon group having a straight chain, a cyclic, or a branched structure, represented by the general formula of $C_mH_n$ (m and n signify integer); $R_4$ to $R_7$, and $Z_1$ may be the same as each other or different from each other; $R_4$ to $R_7$, and $Z_1$ may arbitrarily bind to form a cyclic structure similar to the general formula (C1a).

[Chemical formula 3]

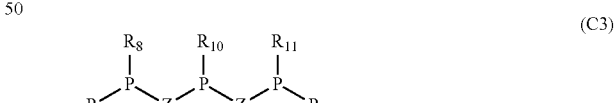

where, in the general formula (C3), $R_8$ to $R_{12}$ are each a hydrocarbon group having a straight chain, a cyclic, or a branched structure, represented by the general formula of $C_mH_n$ (m and n signify integer), or a halogen atom such as fluorine, chlorine, and bromine, or a hydrogen atom; $Z_2$ and $Z_3$ are each a hydrocarbon group having a straight chain, a cyclic, or a branched structure, represented by the general formula of $C_mH_n$ (m and n signify integer); $R_8$ to $R_{12}$, and $Z_2$ and $Z_3$ may be the same as each other or different from each other; $R_8$ to $R_{12}$, and $Z_2$ and $Z_3$ may arbitrarily bind to form a cyclic structure similar to the general formula (C1a).

[Chemical formula 4]

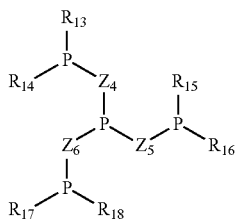

(C4)

where, in the general formula (C4), $R_{13}$ to $R_{18}$ are each a hydrocarbon group having a straight chain, a cyclic, or a branched structure, represented by the general formula of $C_mH_n$ (m and n signify integer), or a halogen atom such as fluorine, chlorine, and bromine, or a hydrogen atom; $Z_4$ to $Z_6$ are each a hydrocarbon group having a straight chain, a cyclic, or a branched structure, represented by the general formula of $C_mH_n$ (m and n signify integer); $R_{13}$ to $R_{18}$, and $Z_4$ to $Z_6$ may be the same as each other or different from each other; $R_{13}$ to $R_{18}$, and $Z_4$ to $Z_6$ may arbitrarily bind to form a cyclic structure similar to the general formula (C1a).

Furthermore, in the phosphine compounds represented by the general formulae (C1) to (C4), there can also be preferably used a phosphinite compound in which any one of $R_1$ to $R_{18}$ and $Z_1$ to $Z_6$ within a single molecule is changed to alkoxy group (RO—) or oxyalkoxy group (—ORO—).

Specific examples of the phosphinite compound include the compounds or the like represented by the general formulae (C1b), (C2a), and (C2b), but the phosphinite compound of the present invention is not limited thereto.

[Chemical formula 5]

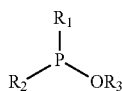

(C1b)

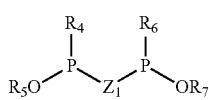

(C2a)

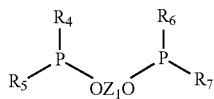

(C2b)

where, in the general formulae (C1b), (C2a), and (C2b), $R_1$ to $R_7$, and $Z_1$ signify the similar groups to $R_1$ to $R_7$ and $Z_1$, given in the above general formulae (C1) and (C2), respectively.

Among them, preferred phosphorus-containing additive (B) is a phosphine compound or a phosphinite compound having a total of two or more of at least one kind selected from phosphine group and phosphinite group, (bidentate or more dentate), for having a large molecular weight, giving excellent hot water resistance, and exerting a great effect as the metal inactivator because of a chelate effect. A (bidentate to tetradentate) polydentate phosphine compound and a polydentate phosphinite compound are more preferable. From the viewpoint of cost, a (bidentate) polydentate phosphine compound and a phosphinite compound are further more preferable. And from the viewpoint of the hydrolysis resistance and hot water resistance, most preferable one is a (bidentate) polydentate phosphine compound. The phosphorus-containing additive (B) can be used alone, and the combined use of a plurality of kinds of additives is also suitable. Furthermore, the combined use with other oxidant such as phosphorous acid ester (phosphite), thioether, hindered amine, or hindered phenol is also suitable.

Preferred examples of the phosphine compound represented by the general formula (C1) include trimethylphosphine, triethylphosphine, tripropylphosphine, triisopropylphosphine, tri-n-butylphosphine, tri-s-butylphosphine, tri-1-butylphosphine, tri-t-butylphosphine, tripentylphosphine, trihexylphosphine, triheptylphosphine, trioctylphosphine, tris(ethylhexyl)phosphine, trinonylphosphine, tridecylphosphine, tris(hydroxymethyl)phosphine, tris(2-carboxyethyl)phosphine, dicyclohexylethylphosphine, di-t-butylneopentylphosphine, diadamantylphosphine, tricyclopentylphosphine, tricyclohexylphosphine, triallylphosphine, tribenzylphosphine, phenylphosphine, tolylphosphine, (2,4,6-tri-t-butylphenyl)phosphine, (methoxyphenyl)phosphine, diphenylphosphine, bis(methoxyphenyl)phosphine, phenyl-di(methoxyphenyl)phosphine, diphenyl(methoxyphenyl)phosphine, tri(methoxyphenyl)phosphine, (hydroxyphenyl)diphenylphosphine, bis(hydroxyphenyl)phenylphosphine, tris(hydroxyphenyl)phosphine, ditolylphosphine, bis(3,5-dimethylphenyl)phosphine, bis(trifluoromethylphenyl)phosphine, di-t-butylphenylphosphine, triphenylphosphine, diphenyltolylphosphine, tris(dimethylphenyl)phosphine, tris(trimethylphenyl)phosphine, diethylphenylphosphine, dicyclohexylphenylphosphine, dicyclohexyltolylphosphine, dicyclohexyl(trimethylphenyl)phosphine, diphenylvinylphosphine, divinylphenylphosphine, trisulfophenylphosphine, tris(pentafluorophenyl)phosphine, tris(trifluoromethylphenyl)phosphine, tritolylphosphine, tris[4-(3,3,4,4,5,5,6,6,7,7,8,8,8-tridecafluoro octyl)phenyl]phosphine, trinaphthylphosphine, trifurylphosphine, trithiophenylphosphine, dimethylphenylphosphine, methyldiphenylphosphine, ethyldiphenylphosphine, propyldiphenylphosphine, isopropyldiphenylphosphine, (4-(N,N-dimethylamino)phenyl)-di-t-butylphosphine, dicyclohexyl(methylphenyl)phosphine, diallylphenylphosphine, tris-dimethylaminophosphine, tris-dimethylaminophosphine, diphenyltrimethylsilylphosphine, tris(trimethylsilyl)phosphine, diphenylphosphinobenzene sulfonic acid and a salt thereof, (phenylphosphinidene)bis(benzene sulfonic acid) and a salt thereof, tris(sulfophenyl)phosphine and a salt thereof, tris(methylsulfophenyl)phosphine and a salt thereof, tris(dimethylsulfophenyl)phosphine and a salt thereof, dicyclohexyl phosphino-2,6-dimethoxy-1,1'-biphenyl sulfonic acid and a salt thereof, compounds represented by the formulae (C5) to (C86), and the like. The phosphine compounds contained in the polymer electrolyte composition of the present invention are not limited to the above examples.

[Chemical formula 6]

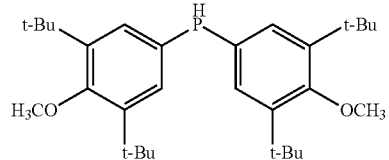

(C5)

-continued
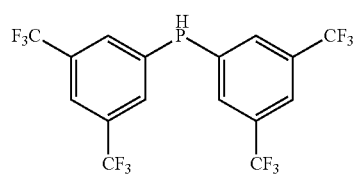
(C6)
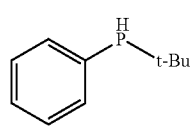
(C7)
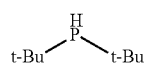
(C8)
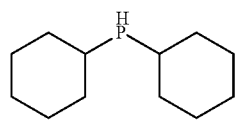
(C9)
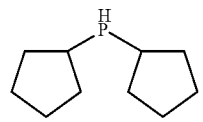
(C10)
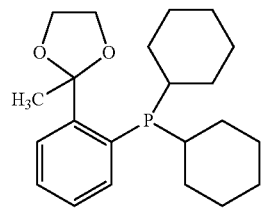
(C11)
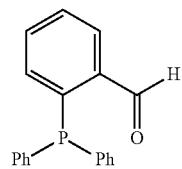
(C12)
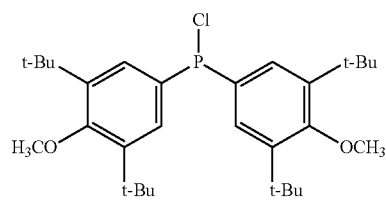
(C13)
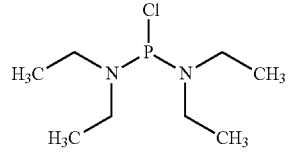
(C14)
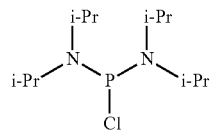
(C15)
-continued
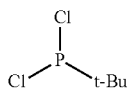
(C16)
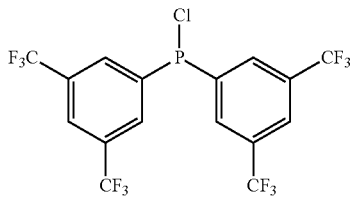
(C17)
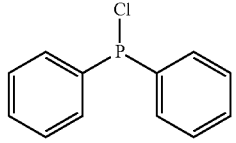
(C18)
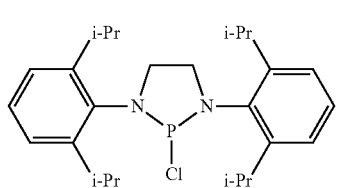
(C19)
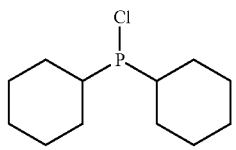
(C20)
(C21)
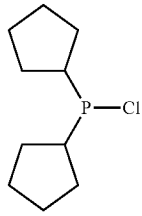
(C22)
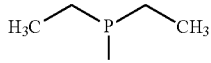
(C23)
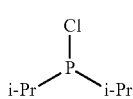
(C24)
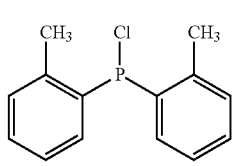
(C25)
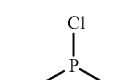
(C26)
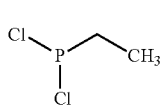

(C27) 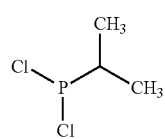
(C28) 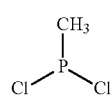
(C29) 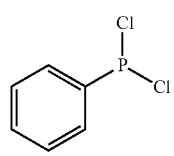
(C30) 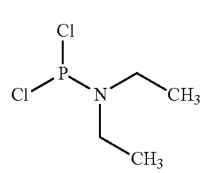
(C31) 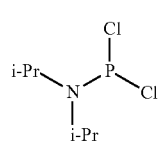
(C32) 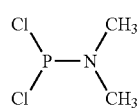
(C33) 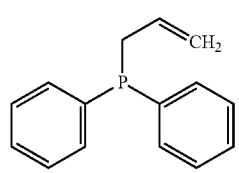
(C34) 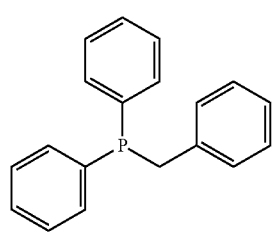
(C35) 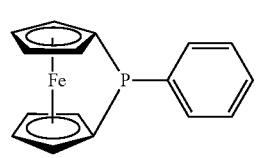
(C36) 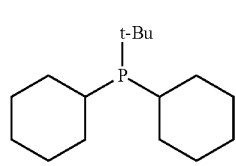
(C37) 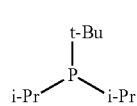
(C38) 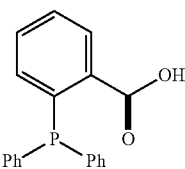
(C39) 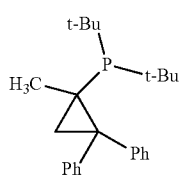
(C40) 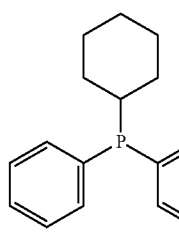
(C41) 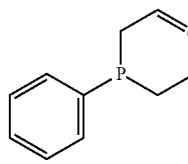
(C42) 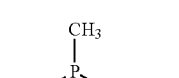
(C43) 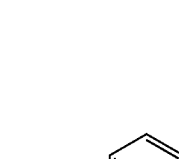
(C44) 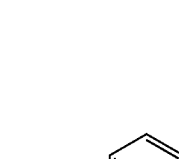

(C45) 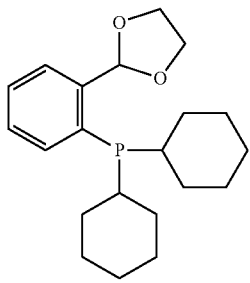
(C46) 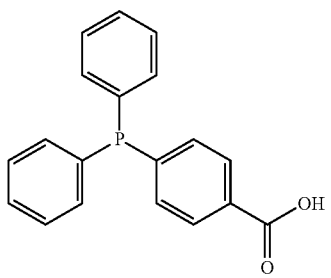
[Chemical formula 7]
(C47) 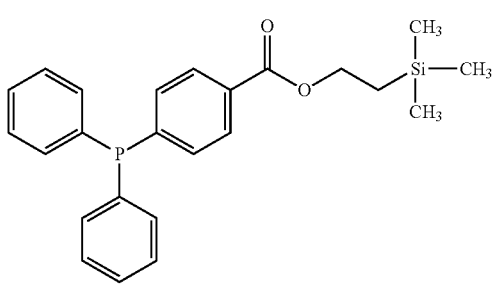
(C48) 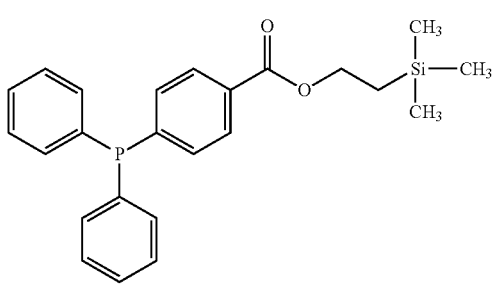
(C49) 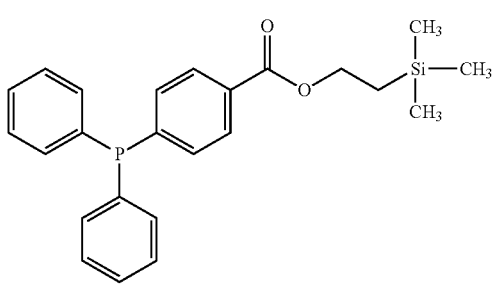
(C50) 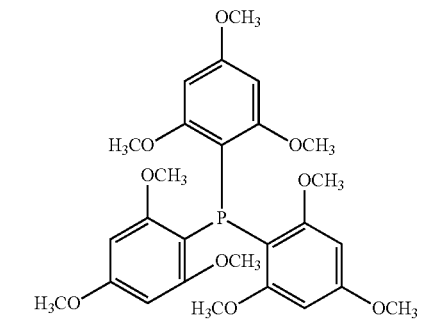
(C51) 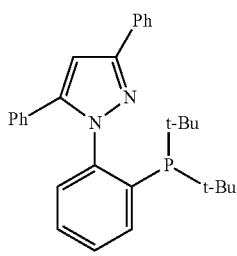
(C52) 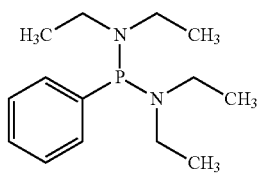
(C53) 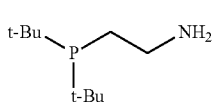
(C54) 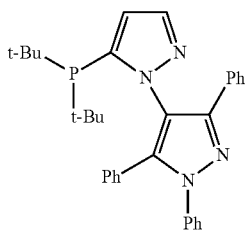
(C55) 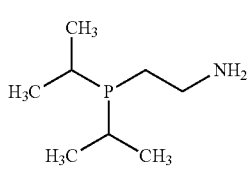
(C56) 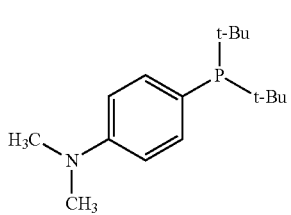

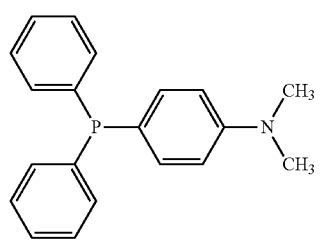
(C57)
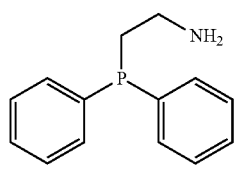
(C58)
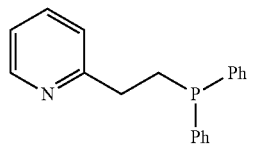
(C59)
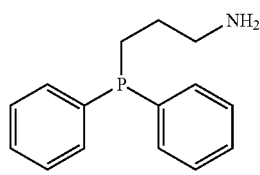
(C60)
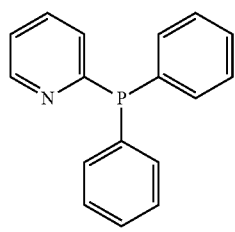
(C61)
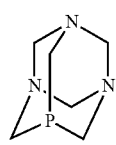
(C62)
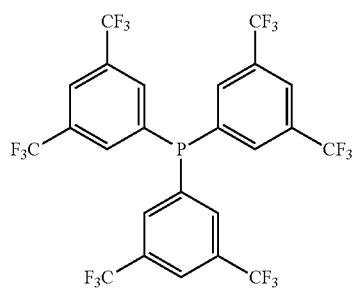
(C63)
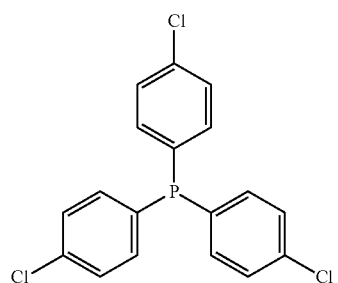
(C64)
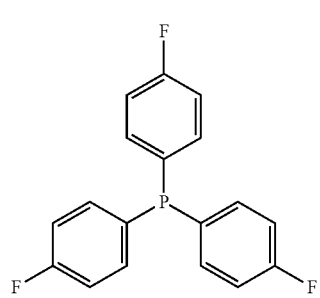
(C65)
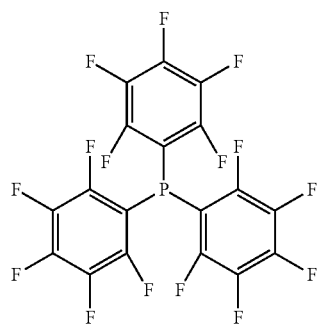
(C66)
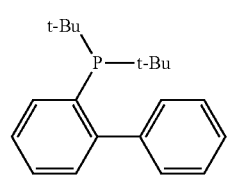
(C67)
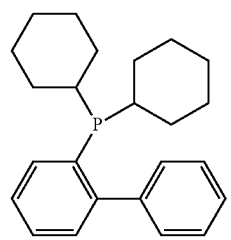
(C68)
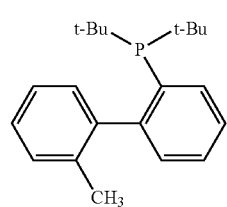
(C69)

(C70) 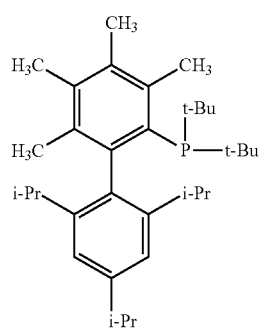
(C71) 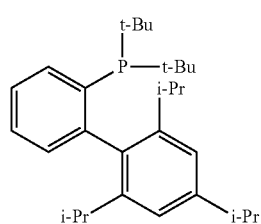
(C72) 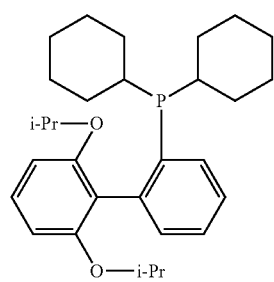
(C73) 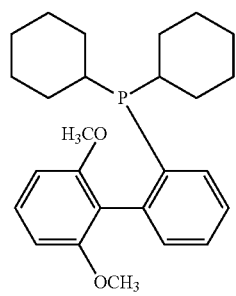
(C74) 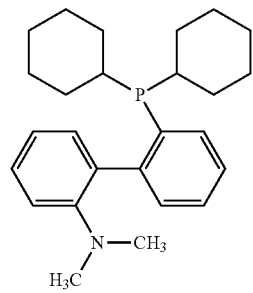
(C75) 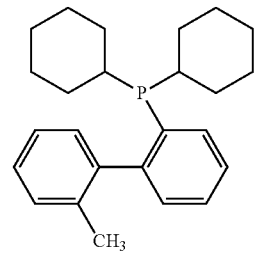
(C76) 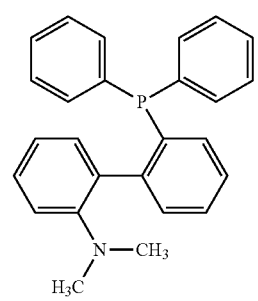
(C77) 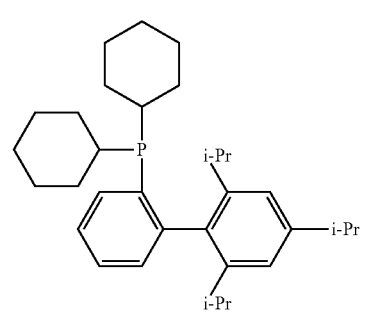
(C78) 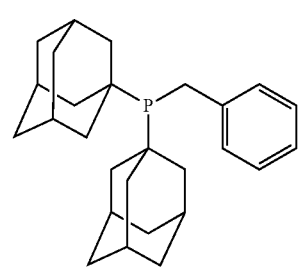
(C79) 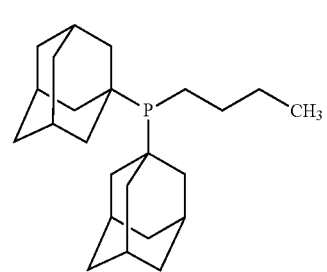

-continued

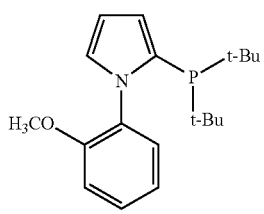
(C80)

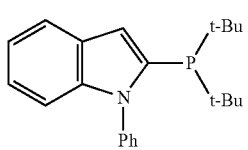
(C81)

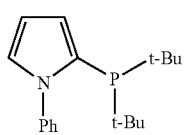
(C82)

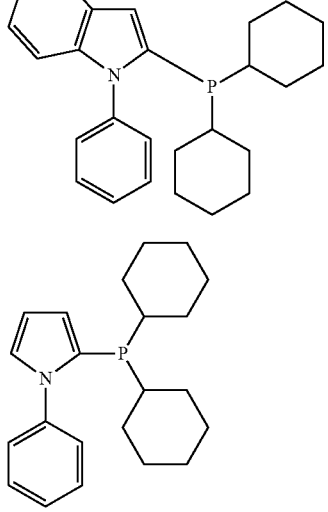
(C83)

(C84)

(C85)

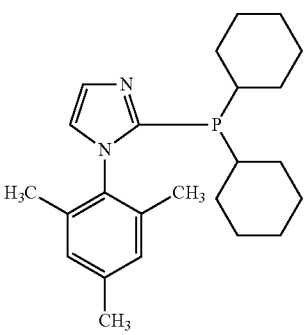
(C86)

Preferred specific examples of the bidentate phosphine compound represented by the general formula (C2) include bis(diphenylphosphino)methane, bis(diphenylphosphino)ethane, bis(diphenylphosphino)propane, bis(diphenylphosphino)butane, bis(diphenylphosphino)pentane, bis(diphenylphosphino)hexane, bis(diphenylphosphino)heptane, bis(diphenylphosphino)octane, bis(diphenylphosphino)nonane, bis(diphenylphosphino)decane, bis[bis(pentafluorophenyl)phosphino]ethane, bis(diphenylphosphino)ethylene, bis(diphenylphosphino)acetylene, bis[(phenylpropanesulfonic acid) phosphine]butane and a salt thereof, ((diphenylphosphino)phenyl)diphenylphosphine, bis(dimethylphosphino)methane, bis(dimethylphosphino)ethane, bis(diethylphosphino)ethane, bis(dicyclohexylphosphino)methane, bis(dicyclohexylphosphino)ethane, bis(dicyclohexylphosphino)propane, bis(dicyclohexylphosphino)butane, bis(diphenylphosphino)benzene, bis(diphenylphosphinophenyl)ether, bis(diphenylphosphino)benzophenone, 2,2'-bis(diphenylphosphino)-1,1'-binaphthyl (hereinafter also referred to as BINAP), bis(diphenylphosphinomethyl)benzene, bis(dicyclohexylphosphinophenyl)ether, bis(dicyclohexylphosphino)benzophenone, phenylenebiphosphine, tetraphenylbiphosphine, following formulae (C87) to (C110) and the like.

[Chemical formula 9]

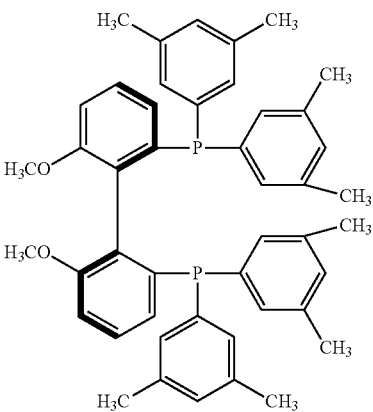
(C87)

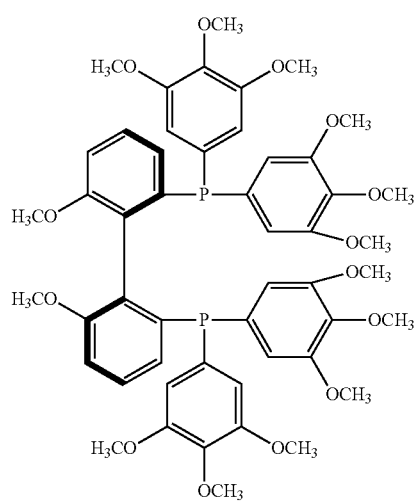
(C88)
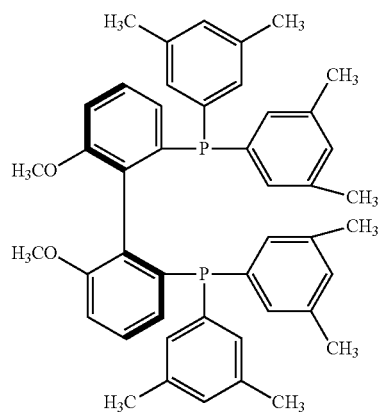
(C89)
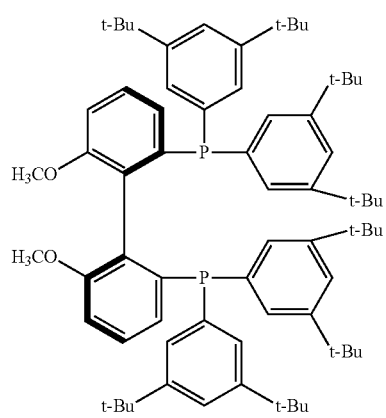
(C90)
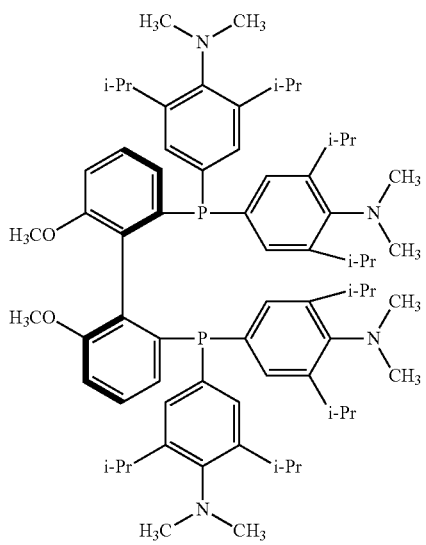
(C91)
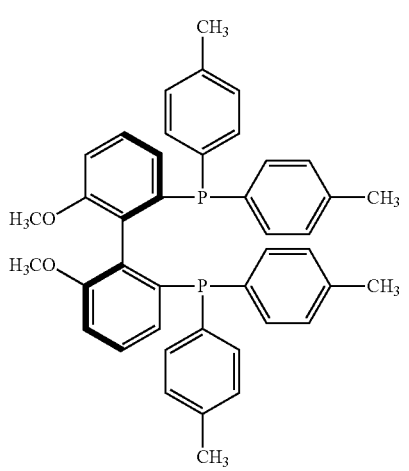
(C92)
(C93)

-continued
(C94)
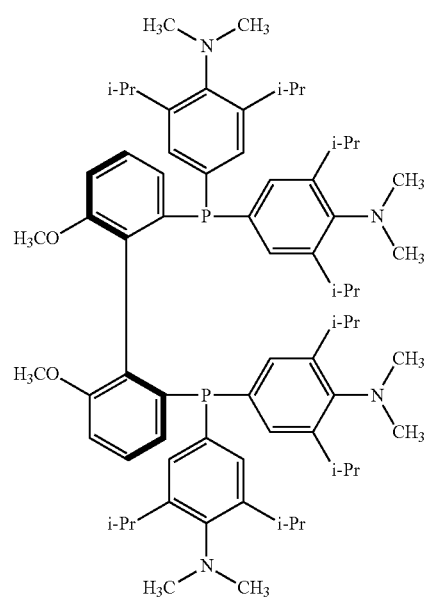
(C95)
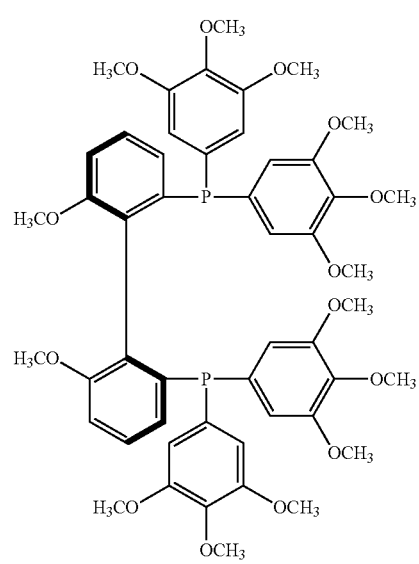
(C96)
-continued
(C97)
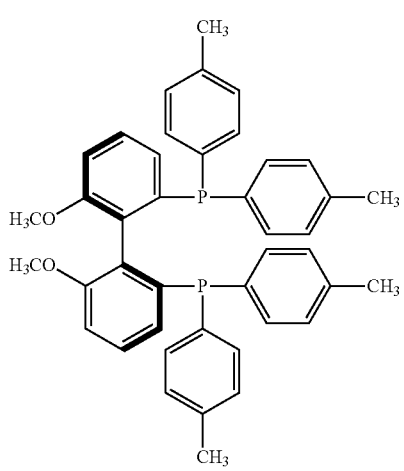
(C98)
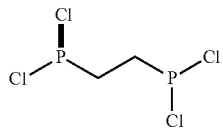
(C99)
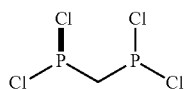
(C100)
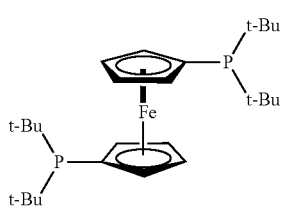
(C101)
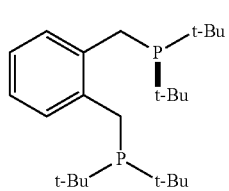
(C102)
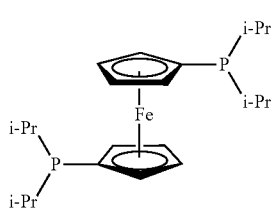
(C103)
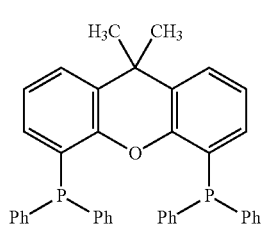

-continued

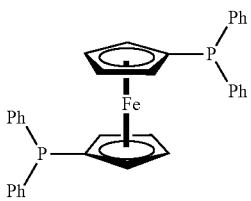

[Chemical formula 10]

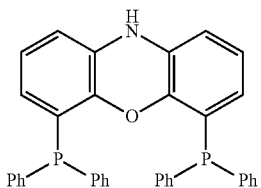

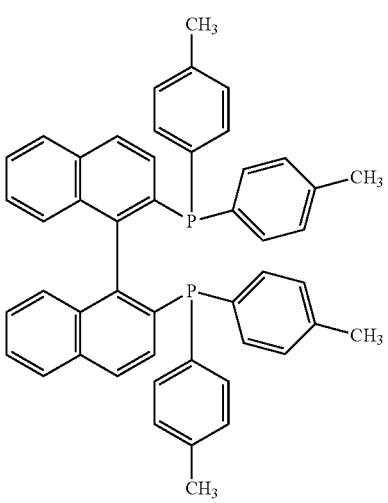

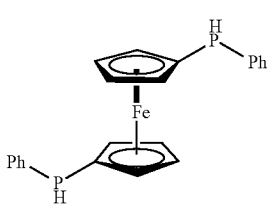

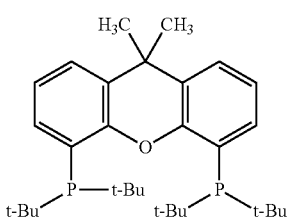

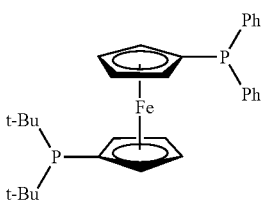

(C104) 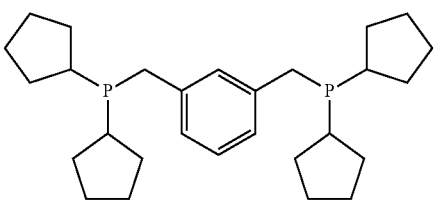

(C105)

(C106)

(C107)

(C108)

(C109)

(C110)

Preferred specific examples of the tridentate phosphine compound represented by the general formula (C3) include bis(2-diphenylphosphinoethyl)phenylphosphine, bis(2-dicyclopentylphosphinoethyl)cyclopentylphosphine, bis(2-dicyclohexylphosphinoethyl)cyclohexylphosphine, tris(diphenylphosphino-methyl)methane, tris(diphenylphosphino-ethyl)methane, tris(diphenylphosphino-methyl)ethane, tris(diphenylphosphino-ethyl)ethane, tris(diphenylphosphino-methyl)propane, and tris(diphenylphosphino-ethyl)propane and the like.

Furthermore, preferred specific examples of the tetradentate phosphine compound represented by the general formula (C4) include tris[2-(diphenylphosphino)ethyl]phosphine and the like.

Among these phosphine compounds, from the viewpoint of hot water resistance and of cost, more preferable ones are bis(diphenylphosphino)methane, bis(diphenylphosphino)ethane, bis(diphenylphosphino)propane, bis(diphenylphosphino)butane, bis(diphenylphosphino)pentane, bis(diphenylphosphino)hexane, bis(diphenylphosphino)pentane, bis(diphenylphosphino)octane, bis(diphenylphosphino)nonane, bis(diphenylphosphino)decane, bis[bis(pentafluorophenyl)phosphino]ethane, bis(diphenylphosphino)ethylene, bis(diphenylphosphino)acetylene, bis[(phenylpropane sulfonic acid)phosphine]butane and a salt thereof, ((diphenylphosphino)phenyl)diphenylphosphine, bis(dimethylphosphino)methane, bis(dimethylphosphino)ethane, bis(diethylphosphino)ethane, bis(dicyclohexylphosphino)methane, bis(dicyclohexylphosphino)ethane, bis(dicyclohexylphosphino)propane, bis(dicyclohexylphosphino)butane, bis(diphenylphosphino)benzene, bis(diphenylphosphinophenyl)ether, bis(diphenylphosphino)benzophenone, BINAP, bis(diphenylphosphinomethyl)benzene, bis(dicyclohexylphosphinophenyl)ether, bis(dicyclohexylphosphino)benzophenone, phenylenebiphosphine, and tetraphenylbiphosphine. Further preferred ones are bis(diphenylphosphino)ethane, bis(diphenylphosphino)propane, bis(diphenylphosphino)butane, bis[bis(pentafluorophenyl)phosphino]ethane, bis[(phenylpropane sulfonic acid)phosphine]butane and a salt thereof, ((diphenylphosphino)phenyl)diphenylphosphine, bis(dicyclohexylphosphino)ethane, bis(dicyclohexylphosphino)propane, bis(dicyclohexylphosphino)butane, bis(diphenylphosphino)benzene, and BINAP. Most preferred ones are bis(diphenylphosphino)ethane, bis(diphenylphosphino)propane, bis(diphenylphosphino)butane, bis(diphenylphosphino)benzene, and BINAP.

Furthermore, examples of the phosphinite compound include methoxydiphenylphosphine, ethoxydiphenylphosphine, butoxydiphenylphosphine, and compounds represented by the formulae (C111) and (C112). In addition, examples of the bidentate phosphinite compound include 3,5-bis[(diphenylphosphino)oxy]ethylbenzoate.

[Chemical formula 11]

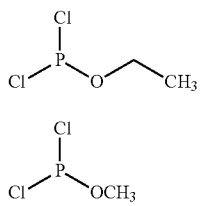

(C111)

(C112)

The content of the phosphorus-containing additive (B) used in the present invention can be adequately selected in consideration of the balance between power generation characteristics and durability, and is not limited. However, the content thereof is preferably 0.02% by weight or larger and 35% by weight or smaller relative to the entire polymer electrolyte composition, more preferably 0.1% by weight or larger and 5% by weight or smaller, and most preferably 0.5% by weight or larger and 3% by weight or smaller. When the content thereof is smaller than 0.02% by weight, the durability becomes insufficient in some cases, which is not preferable. In addition, when the content thereof exceeds 35% by weight, the proton conductivity becomes insufficient in some cases, which is not preferable.

It is also preferable that the polymer electrolyte composition of the present invention further contains at least one transition metal selected from the group consisting of Ce, Mn, Ti, Zr, V, Cr, Mo, W, Ru, Co, Rh, Ir, Ni, Pd, Pt, Ag, and Au. As these transition metals, there can be used one or more selected from the group consisting of these transition metals, ions of these transition metals, salts containing these transition metals, and oxides of these transition metals.

Among them, preferable ones are Ce, Mn, V, Mo, W, Ru, Co, Rh, Ir, Ni, Pd, Pt, Ag, and Au from the viewpoint of high functions as the radical scavenger and the peroxide decomposer, more preferable ones are Ce, Mn, Ru, Co, Rh, Ir, Ni, Pd, Pt, Ag, and Au, further preferable ones are Ru, Co, Rh, Ir, Ni, Pd, Pt, Ag, and Au, and most preferable ones are Ru, Rh, Ir, Ni, Pd, and Au.

The content of the transition metal used in the present invention can be adequately selected in consideration of the balance between the power generation characteristics and the durability, and is not limited. However, the content thereof is preferably 0.02% by weight or larger and 35% by weight or smaller relative to the entire polymer electrolyte composition, more preferably 0.1% by weight or larger and 5% by weight or smaller, and most preferably 0.5% by weight or larger and 3% by weight or smaller. When the content thereof is smaller than 0.02% by weight, the durability becomes insufficient in some cases, which is not preferable. In addition, when the content thereof exceeds 35% by weight, the proton conductivity becomes insufficient in some cases, which is not preferable.

Furthermore, the content ratio of the phosphorus-containing additive (B) to the transition metal, used in the present invention can also be adequately selected in consideration of the balance between the power generation characteristics and the durability, and is not limited. However, the molar ratio of phosphorus to transition metal is preferably 0.1 or larger and 100 or smaller, more preferably 1 or larger and 20 or smaller, and most preferably 5 or larger and 10 or smaller. When the ratio of phosphorus to transition metal is smaller than 0.1, the proton conductivity and the hot water resistance become insufficient in some cases, which is not preferable. In addition, when the ratio thereof exceeds 100, the effect of improvement in the durability becomes small in some cases, which is not preferable.

Examples of salt that contains a transition metal ion include a salt containing a positive trivalent cerium ion, a salt containing a positive tetravalent cerium ion, a salt containing a positive divalent manganese ion, and a salt containing a positive trivalent manganese. The salt containing a positive trivalent cerium ion includes cerium acetate, cerium chloride, cerium nitrate, cerium carbonate, cerium sulfate and the like. The salt containing positive tetravalent cerium ion includes cerium sulfate, ammonium cerium (IV) sulfate and the like. The salt containing a positive divalent manganese ion includes manganese acetate, manganese chloride, manganese nitrate, manganese carbonate, manganese sulfate and the like. The salt containing a positive trivalent manganese includes manganese acetate and the like. Among them, the use of cerium nitrate and manganese nitrate is preferred because of the high suppression effect of the oxidation deterioration.

Those transition metal ions may exist alone or can exist as a complex coordinating with an organic compound, a polymer, and the like. Among them, a preferable complex is the one with phosphine compound and the like from the viewpoint of being able to suppress elution of the additive during use. The use of polydentate phosphine compound provides a polymer electrolyte composition having specifically excellent hot water resistance.

Furthermore, examples of the oxide of transition metal include cerium oxide, manganese oxide, ruthenium oxide, cobalt oxide, nickel oxide, chromium oxide, iridium oxide, and lead oxide. Among them, cerium oxide and manganese oxide are preferred because of the high effect of suppressing the oxidation deterioration.

According to the present invention, the phosphorus-containing additive (B) component can be used alone, but the combined use with a plurality of additives is also possible. In the present invention, the method of adding the phosphorus-containing additive (B) to the ionic group-containing polymer (A) is not specifically limited, and examples of the method of adding thereof are given below. Among them, (1) to (3) are preferred because of superior mass productivity.

(1) A method of dissolving or dispersing the phosphorus-containing additive (B) in a solution or dispersion of the ionic group-containing polymer (A), and then forming membrane by using the resultant solution to thereby produce the polymer electrolyte membrane.

(2) A method of coating the liquid of dissolved phosphorus-containing additive (B) on the polymer electrolyte membrane composed of the ionic group-containing polymer (A).

(3) A method of immersing the polymer electrolyte membrane composed of the ionic group-containing polymer (A) into the liquid of dissolved phosphorus-containing additive (B).

Next, the ionic group-containing polymer (A) used in the present invention will be explained below.

Applicable ionic group-containing polymer (A) in the present invention is any of the perfluoro-based polymer containing an ionic group and the hydrocarbon-based polymer containing an ionic group as long as the polymer satisfies both power generation characteristics and chemical stability. The hydrocarbon-based polymer containing an ionic group according to the present invention means the polymer containing an ionic group, other than the perfluoro-based polymer. The perfluoro-based polymer referred to herein means the polymer in which most or all the hydrogen atoms of the alkyl group and/or the alkylene group in the polymer are substituted with fluorine atoms. In this Description, the polymer in which 85% or more of hydrogen atoms of the alkyl group and/or the alkylene group in the polymer are substituted with fluorine atoms is defined as the perfluoro-based polymer. Typical examples of the perfluoro-based polymer containing an ionic group according to the present invention can include commercial products such as Nafion (registered trademark, manufactured by DuPont), Flemion (registered trademark, manufactured by Asahi Glass Co.), and Aciplex (registered trademark, manufactured by Asahi Kasei Corporation). The structure of these perfluoro-based polymers containing an ionic group can be represented by the general formula (N1). However, the perfluoro-based polymers used in the present invention are not limited to these.

[Chemical formula 12]

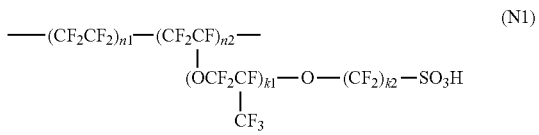

where, in the formula (N1), n1 and n2 are each independently a natural number, and k1 and k2 are each independently an integer of 0 to 5.

These perfluoro-based polymers containing an ionic group are very expensive and have a problem of large cross-over, and thus the ionic group-containing polymer (A) used in the present invention is preferably a hydrocarbon-based polymer having an aromatic ring in the main chain and containing an ionic group, from the viewpoint of mechanical strength, physical durability, chemical stability, and the like. Among them, more preferable one is a polymer having sufficient mechanical strength and physical durability being used as engineering plastics. The aromatic ring may contain not only hydrocarbon-based aromatic ring, but also hetero ring and the like. Furthermore, together with the aromatic ring unit, aliphatic-based unit may structure the polymer as a part thereof. The aromatic unit may contain an arbitrary substituent such as hydrocarbon-based group (including alkyl group, alkoxy group, aromatic group, and allyloxy group), halogen group, nitro group, cyano group, amino group, halogenated alkyl group, carboxyl group, phosphonic acid group, or hydroxyl group.

Specific examples of polymer having aromatic ring in the main chain include polymers such as polysulfone, polyethersulfone, polyphenyleneoxide, polyaryleneether-based polymer, polyphenylenesulfide, polyphenylenesulfidesulfone, polyparaphenylene, polyarylene-based polymer, polyaryleneketone, polyetherketone, polyarylenephosphine oxide, polyetherphosphine oxide, polybenzoxazole, polybenzthiazole, polybenzimidazole, aromatic polyamide, polyimide, polyetherimide, and polyimidesulfone. Meanwhile, polysulfone, polyethersulfone, polyetherketone, and the like referred to herein are general names of polymers having sulfone bond, ether bond, and ketone bond in the respective molecular chains, and include polyetherketoneketone, polyetheretherketone, polyetheretherketoneketone, polyetherketoneetherketoneketone, polyetherketonesulfone and the like, and do not limit the specific polymer structures.

Among these polymers, more preferable ones, in view of mechanical strength, physical durability, processability and hydrolysis resistance, are polymers such as polysulfone, polyethersulfone, polyphenylene oxide, polyaryleneether-based polymer, polyphenylenesulfide, polyphenylenesulfidesulfone, polyaryleneketone, polyetherketone, polyarylenephosphine oxide, and polyetherphosphine oxide.

Among them polymers, from the point of mechanical strength, physical durability, and manufacturing cost, aromatic polyether-based polymers are more preferable. Aromatic polyetherketone-based polymers are specifically preferable from the viewpoint of exhibiting crystallinity caused by good packing of main chain skeleton structure and by extremely strong intermolecular aggregation force, and having a property of completely insoluble in general solvents, and from the viewpoint of good tensile strength and elongation, tear strength, and fatigue resistance. The aromatic polyetherketone (PEK)-based polymer referred to herein is a general name of polymers having at least an ether bond and a ketone bond in the molecular chain, and includes polyetherketone, polyetherketoneketone, polyetheretherketone, polyetheretherketoneketone, polyetherketoneetherketoneketone, polyetherketonesulfone, polyetherketonephosphine oxide, polyetherketone nitrile and the like.

From the viewpoint of proton conductivity under low-humidification conditions and power generation characteristics, the ionic group-containing polymer (A) used in the present invention is more preferably a block copolymer containing at least one of each of a segment (A1) containing an ionic group and a segment (A2) not containing an ionic group. A block copolymer containing one or more of each of the segment (A1) containing an ionic group, the segment (A2) not containing an ionic group, and a linker moiety connecting the segments is also a preferable example.

According to the present invention, the term "segment" means a partial structure in the block copolymer, composed of combination of repeating units of single kind or of repeating units of several kinds and having a molecular weight of 2,000 or larger. The block copolymer used in the present invention contains both the segment (A1) containing an ionic group and the segment (A2) not containing an ionic group. Although the present invention describes "segment not containing an ionic group", the segment (A2) can contain a small amount of ionic groups within a range of not adversely affecting the effect of the present invention. Hereinafter the term "not containing an ionic group" is used in a similar meaning to the above in some cases.

Furthermore, according to the present invention, the term "linker" means a moiety to connect the segment (A1) containing an ionic group with the segment (A2) not containing an ionic group, and is defined as a moiety having a chemical structure different from that of the segment (A1) containing an ionic group and from that of the segment (A2) not containing an ionic group. The linker can connect different segments while suppressing randomization, segment cutting, and side reactions in the ether-exchange reaction, and thus the linker is necessary in order to obtain the block copolymer used in the present invention. When the linker is absent, segment cutting such as randomizing may occur, which fails to fully obtain the effect of the present invention.

The block copolymer as the ionic group-containing polymer (A) used in the present invention forms a single polymer chain by connecting two or more kinds of segment chains insoluble to each other, that is, a hydrophilic segment containing an ionic group and a hydrophobic segment not containing an ionic group, at the linker moiety thereof. In the block copolymer, the short-range interaction generated from repellence between chemically-different segment chains generates phase separation to nano- or micro-domains structured by the respective segment chains, and the long-range interaction generated from covalent bond of segment chains with each other allows the individual domains to arrange in a specific order. The higher structure created by the gathering of domains made from individual segment chains is called the "nano- or micro-phase separation structure", and as to the ion conduction through the polymer electrolyte membrane, the spatial arrangement of ion-conductive segments in the membrane, that is, nano- or micro-phase separation structure becomes important. Here, the term "domain" means a mass formed by aggregation of similar segments in a single or a plurality of polymer chains.

The ionic group-containing polymer (A) used in the present invention is specifically a block copolymer containing each one or more of: a segment (A1) containing an ionic group; a segment (A2) not containing an ionic group; and a linker moiety connecting these segments, and more preferably is the one which contains the segment (A1) containing an ionic group and the segment (A2) not containing an ionic group, containing the respective constituent units represented by the general formula (S1) and the general formula (S2).

[Chemical formula 13]

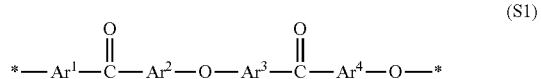

(S1)

where, in the general formula (S1), $Ar^1$ to $Ar^4$ are each an arbitrary divalent arylene group; $Ar^1$ and/or $Ar^2$ contains an ionic group; $Ar^3$ and $Ar^4$ can contain or not contain an ionic group; $Ar^1$ to $Ar^4$ can each be arbitrarily substituted, and can each independently use two or more kinds of arylene group; and the symbol * signifies a bond moiety with the general formula (S1) or with other constituent unit.

[Chemical formula 14]

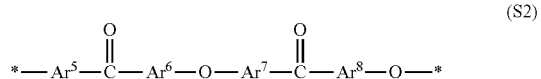

(S2)

where, in the general formula (S2), $Ar^5$ to $Ar^8$ are each an arbitrary divalent arylene group, which can each be arbitrarily substituted, and which do not contain an ionic group; $Ar^5$ to $Ar^8$ can each independently use two or more kinds of arylene group; and the symbol * signifies a bond moiety with the general formula (S2) or with other constituent unit.

The block copolymer containing the constituent units represented by the general formulae (S1) and (S2) chemically stabilizes all the arylene groups by the electron-withdrawing ketone group, and further improves the physical durability through toughening by giving crystallinity and through softening by lowering the glass transition temperature, thus the block copolymer can provide, as the polymer electrolyte composition and specifically as the polymer electrolyte membrane, excellent performance of proton conductivity also under low-humidification conditions, power generation characteristic, processability such as membrane-formation, oxidation resistance, radical resistance, chemical stability such as hydrolysis resistance, membrane mechanical strength, and physical durability such as hot water resistance.

The block copolymer used in the present invention can attain chemical durability and physical durability, and excellent ion conductivity, specifically high proton conductivity even under low-humidification conditions by forming the chemical structure in which the segment (A1) containing an ionic group and the segment (A2) not containing an ionic group contain constituent unit represented by the respective general formulae (S1) and (S2), and further by controlling nano- or micro-phase separation structure as the polymer higher structure.

By adequately selecting the chemical structure, the segment chain length, the molecular weight, the ion-exchange capacity, and the like of the block copolymer used in the present invention, there can be controlled the characteristics such as processability, domain size, crystalline/amorphous property, the mechanical strength, proton conductivity, and dimensional stability of the polymer electrolyte material.

Preferred divalent arylene groups as $Ar^1$ to $Ar^8$ include: hydrocarbon-based arylene groups such as phenylene group, naphthylene group, biphenylene group, and fluorene diyl group; and heteroarylene groups such as pyridine diyl, quinoxaline diyl, and thiophene diyl. However, they are not the limited ones. The $Ar^1$ and/or $Ar^2$ may contain an ionic group, and the $Ar^3$ and $Ar^4$ may contain or may not contain an ionic group. In addition, although $Ar^1$ to $Ar^4$ may be substituted with a group other than an ionic group, non-substitution is more preferable from the viewpoint of proton conductivity, chemical stability and physical durability. Further preferable group is phenylene group and phenylene group containing an ionic group, and most preferable group is p-phenylene group and p-phenylene group containing an ionic group.

Next, as to the block copolymer used in the present invention, preferred examples will be described below. The block copolymer used in the present invention exhibits high proton conductivity under a variety of humidity conditions as the polymer electrolyte material and as the polymer electrolyte membrane, because the segment (A1) containing an ionic group forms the domain.

The ionic group used in the block copolymer in the present invention is preferably an atomic group having a negative charge, and more preferably the one having proton-exchange capability. That type of functional group preferably includes sulfonic acid group, sulfonimide group, sulfuric acid group, phosphonic acid group, phosphoric acid group, and carboxylic acid group. The sulfonic acid group means a group represented by the general formula (f1), the sulfonimide group means a group represented by the general formula (f2) (R in the general formula (f2) is an arbitrary organic group), sulfuric acid group means a group represented by the general formula (f3), phosphonic acid group means a group represented by the general formula (f4), phosphoric acid group means a group represented by the general formula (f5) or the general formula (f6), and carboxylic acid group means a group represented by the general formula (f7).

[Chemical formula 15]

(f1)

-continued

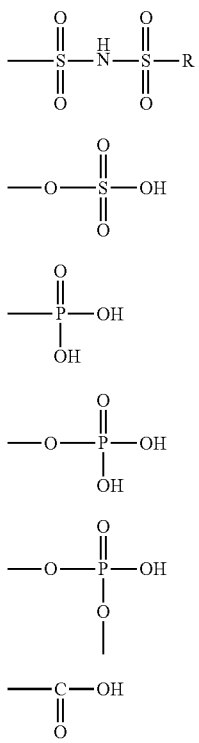

These ionic groups include the ones in which the functional groups (f1) to (f7) become the respective salts. The cations forming these salts can include arbitrary metal cation and $NR_4^+$ (R is an arbitrary organic group). The metal cation can be used without limiting the number of valence, and the like. Specific examples of preferable metal cation are Li, Na, K, Rh, Mg, Ca, Sr, Ti, Al, Fe, Pt, Rh, Ru, Ir, and Pd. Among them, Na, K, and Li which are inexpensive and easily capable of proton-substitution are preferably used for the block copolymer to be used in the present invention.

The polymer electrolyte material can contain two or more kinds of these ionic groups, and the combination thereof is adequately determined by the polymer structure and the like. Among them groups, at least one kind of ionic group selected from sulfonic acid group, sulfone imide group, and sulfuric acid group is preferably contained from the viewpoint of high proton conductivity, at least sulfonic acid group is most preferably contained from the viewpoint of raw material cost.

When the block copolymer used in the present invention contains sulfonic acid group, the ion-exchange capacity thereof is preferably in a range of 0.1 to 5 meq/g from the viewpoint of balance between the proton conductivity and the water resistance, more preferably 1.5 meq/g or larger, and most preferably 2 meq/g or larger. The ion-exchange capacity of the block copolymer is preferably 3.5 meq/g or smaller, and most preferably 3 meq/g or smaller. When the ion-exchange capacity is smaller than 0.1 meq/g, the proton conductivity becomes insufficient in some cases. When the ion-exchange capacity is larger than 5 meq/g, the water resistance becomes insufficient in some cases. In the present Description, the term "eq" referred to herein signifies "equivalent".

As the block copolymer used in the present invention, the molar composition ratio of the segment (A1) containing an ionic group to the segment (A2) not containing an ionic group, (A1/A2), is preferably 0.2 or larger, more preferably 0.33 or larger, and most preferably 0.5 or larger. In addition, the molar composition ratio (A1/A2) is preferably 5 or smaller, more preferably 3 or smaller, and most preferably 2 or smaller. When the molar composition ratio (A1/A2) is smaller than 0.2 or exceeds 5, the effect of the present invention becomes insufficient in some cases, and further the proton conductivity under low-humidification conditions becomes insufficient, and the hot water resistance and the physical durability become insufficient in some cases, which is unfavorable.

From the viewpoint of proton conductivity under low-humidification conditions, the ion-exchange capacity of the segment (A1) containing an ionic group is preferably high values, more preferably 2.5 meq/g or larger, further preferably 3 meq/g or larger, and most preferably 3.5 meq/g or larger. In addition, the ion-exchange capacity thereof is preferably 6.5 meq/g or smaller, more preferably 5 meq/g or smaller, and most preferably 4.5 meq/g or smaller. When the ion-exchange capacity of the segment (A1) containing an ionic group is smaller than 2.5 meq/g, the proton conductivity under low-humidification conditions becomes insufficient in some cases, and when the ion-exchange capacity thereof exceeds 6.5 meq/g, the hot water resistance and the physical durability become insufficient in some cases, which are unfavorable.

The ion-exchange capacity of the segment (A2) not containing an ionic group is preferably low values from the viewpoint of hot water resistance, mechanical strength, dimensional stability, and physical durability, further preferably 1 meq/g or smaller, further preferably 0.5 meq/g, and most preferably 0.1 meq/g or smaller. When the ion-exchange capacity of the segment (A2) not containing an ionic group exceeds 1 meq/g, hot water resistance, mechanical strength, dimensional stability, and physical durability become insufficient in some cases, which is unfavorable.

The term "ion-exchange capacity" referred to herein means the molar amount of introduced sulfonic acid group per unit dry weight of the block copolymer, the polymer electrolyte material, and the polymer electrolyte membrane, respectively. Higher ion-exchange capacity means higher degree of sulfonation. The ion-exchange capacity can be measured by elemental analysis, neutralization titration, and the like. Although the ion-exchange capacity can be calculated from S/C ratio in the elemental analysis, the measurement becomes difficult when sulfur source other than the sulfonic acid group exists. Therefore, in the present invention, the ion-exchange capacity is defined as the value obtained by the neutralization titration. The polymer electrolyte composition and the polymer electrolyte membrane according to the present invention include the mode of composite constituted of the block copolymer used in the present invention and other component, as described later. However, in that case, the ion-exchange capacity is determined on the basis of the entire amount of the composite.

Measurement examples of the neutralization titration are as follows. The measurements are performed three or more times, and the average of them is adopted.

(1) An electrolyte membrane is substituted by proton, followed by fully rinsing with pure water. After wiping off the water on the surface of the electrolyte membrane, the membrane is dried for 12 hours or more in a vacuum at 100° C., and then the dry weight is obtained.

(2) To the electrolyte membrane, 50 mL of 5% by weight of aqueous solution of sodium sulfate is added, and the electrolyte is allowed to stand for 12 hours and ion-exchange is conducted.

(3) Using a 0.01 mol/L of sodium hydroxide aqueous solution, the generated sulfuric acid is titrated. As the indicator, commercially available 0.1 w/v % phenolphthalein solution for titration is added. The end point is a point where the color turns light purplish red.
(4) The ion-exchange capacity is obtained from the formula below.

Ion-exchange capacity (meq/g)=[Concentration of aqueous solution of sodium hydroxide (mmol/mL)×(Titrated amount (mL))]/[Dry weight of sample (g)]

Applicable method of introducing ionic group for obtaining the block copolymer used in the present invention includes: a method of performing polymerization by using a monomer containing an ionic group; and a method of introducing an ionic group in a polymer reaction.

As the method of performing polymerization by using a monomer containing an ionic group, a monomer containing an ionic group may be used in the repeating units. Such method is, for example, disclosed in Journal of Membrane Science, 197, 2002, p. 231-242. The method is easy in controlling the ion-exchange capacity of polymer and is easy in application in industry, and thus the method is specifically preferred.

The method of introducing an ionic group by polymer reaction will be described below referring to examples. Introduction of a phosphonic acid group into an aromatic polymer can be done by, for example, the method described in Polymer Preprints, Japan, 51, 2002, p. 750. Introduction of a phosphoric acid group into an aromatic polymer can be done by, for example, phosphoric acid esterification of an aromatic polymer containing a hydroxyl group. Introduction of a carboxylic acid group into an aromatic polymer can be done by, for example, oxidation of an aromatic polymer containing an alkyl group or a hydroxy alkyl group. Introduction of a sulfuric acid group into an aromatic polymer can be done by, for example, sulfuric acid esterification of an aromatic polymer containing a hydroxyl group. As the method of sulfonating an aromatic polymer, or the method of introducing a sulfonic acid group, there can be used, for example, the one described in Japanese Patent Laid-Open No. 02-16126, Japanese Patent Laid-Open No. 02-208322 or the like.

Specifically, for example, sulfonation can be performed by causing an aromatic polymer to react with a sulfonation agent such as chlorosulfonic acid in a solvent such as chloroform, or by causing an aromatic polymer to react in concentrated sulfuric acid or oleum. The sulfonation agent is not specifically limited if only the agent can sulfonate the aromatic polymer, and other than the above, sulfur trioxide and the like can be used. In the case of sulfonating an aromatic polymer by the above method, the degree of sulfonation can be controlled by the use amount of the sulfonation agent, the reaction temperature, and the reaction time. Introduction of a sulfone imide group into an aromatic polymer can be done by, for example, a method of causing a sulfonic acid group to react with a sulfone amide group.

The segment (A2) not containing an ionic group is preferably a constituent unit exhibiting crystallinity from the viewpoint of chemical stability and strong intermolecular cohesive force, and the segment (A2) makes it possible to obtain a block copolymer having excellent mechanical strength, dimensional stability, and physical durability.

A specific example of more preferable constituent unit represented by the general formula (S2) which is included in the segment (A2) not containing an ionic group is a constituent unit represented by the general formula (P1) from the viewpoint of availability of raw material. Among them, from the viewpoint of mechanical strength, dimensional stability, and physical durability, due to the crystallinity, the constituent unit represented by the formula (S3) is more preferred. Larger content of the constituent unit represented by the general formula (S2) which is included in the segment (A2) not containing an ionic group is more preferable, 20 mol % or larger content is further preferable, 50 mol % or larger content is more further preferable, and 80 mol % or larger content is most preferable. When the content is smaller than 20 mol %, the effect of the present invention in terms of mechanical strength, dimensional stability, and physical durability, due to crystallinity, becomes insufficient in some cases, which is not favorable.

[Chemical formula 16]

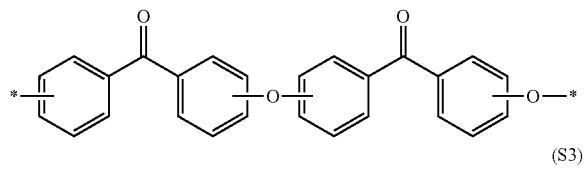

(P1)

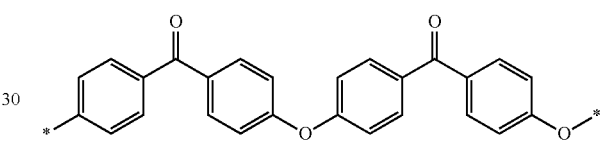

(S3)

where, in the formulae (P1) and (S3), the symbol * signifies a bond moiety with the general formulae (P1) and (S3), or with other constituent unit.

In the segment (A2) not containing an ionic group, a preferred example of constituent unit that is caused to be copolymerized other than the constituent unit represented by the general formula (S2) includes an aromatic polyether-based polymer containing a ketone group, that is, the one having the constituent unit represented by the general formula (Q1), which does not contain an ionic group.

[Chemical formula 17]

(Q1)

where, in the general formula (Q1), $Z^1$ and $Z^2$ are each a divalent organic group containing aromatic ring, each of them may represent two or more kinds of groups, and each of them does not contain an ionic group; and a and b are each a positive integer.

Preferred organic group as $Z^1$ and $Z^2$ in the general formula (Q1) includes the one in which $Z^1$ is phenylene group, and $Z^2$ is at least one kind selected from the general formulae (X-1), (X-2), (X-4), and (X-5). Although the organic group may be substituted by a group other than ionic group, non-substitution is more preferable from the viewpoint of addition of crystallinity. As to $Z^1$ and $Z^2$, more preferable group is phenylene group, and the most preferable one is p-phenylene group.

[Chemical formula 18]

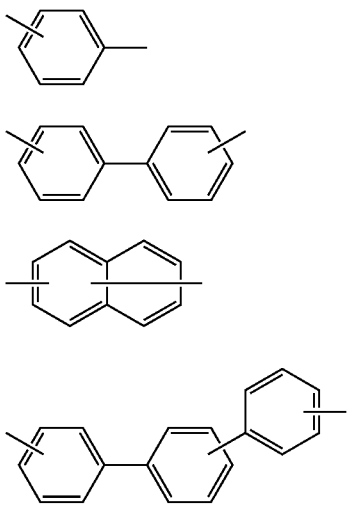

(X-1)
(X-2)
(X-4)
(X-5)

where, the group represented by the respective general formulae (X-1), (X-2), (X-4), and (X-5) may be substituted arbitrarily by a group other than ionic group.

Specific examples of preferred constituent unit represented by the general formula (Q1) are the constituent units represented by the general formulae (Q2) to (Q7), but these constituent units are not the limited ones, and are adequately selectable in consideration of the crystallinity and the mechanical strength. Among them, from the viewpoint of crystallinity and manufacturing cost, more preferable constituent units represented by the general formula (Q1) are those represented by the general formulae (Q2), (Q3), (Q6), and (Q7), and the most preferable ones are the general formulae (Q2) and (Q7).

[Chemical formula 19]

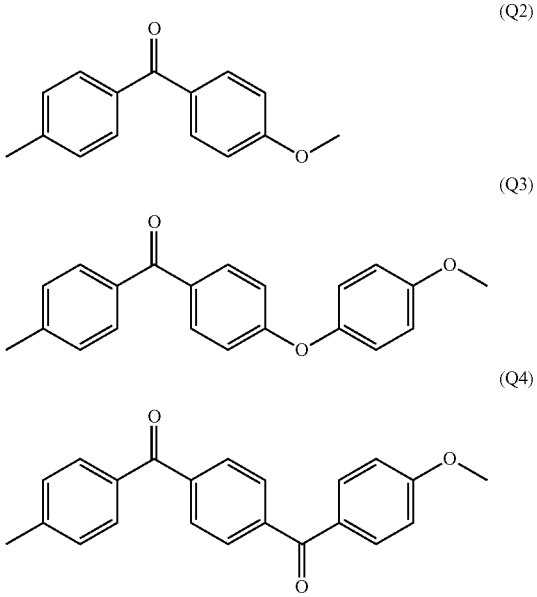

(Q2)
(Q3)
(Q4)

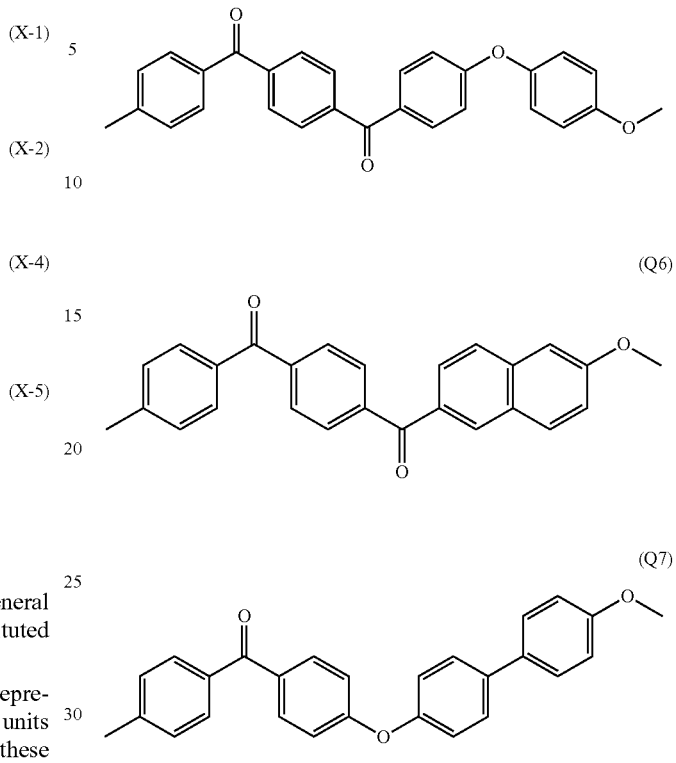

(Q5)
(Q6)
(Q7)

where, the general formulae (Q2) to (Q7) are expressed as compounds with substituents in the para-position, but a binding position other than ortho-position, meta-position or the like may be included as long as the constituent unit has crystallinity. However, para-position is more preferable from the viewpoint of crystallinity.

A constituent unit is more preferable, which is chemically stable, which increases the acidity because of the electron-withdrawing effect, and which introduces sulfonic acid group at high density. As the segment (A1), there can be obtained a block copolymer having excellent proton conductivity under low-humidification conditions.

A specific example of more preferable constituent unit represented by the general formula (S1) included in the segment (A1) containing an ionic group is the constituent unit represented by the general formula (P2) from the viewpoint of availability of raw material. Among them, from the viewpoint of availability of raw material and polymerizability, the constituent unit represented by the formula (P3) is more preferable, and the constituent unit represented by the formula (S4) is most preferable. As to the content of the constituent unit represented by the general formula (S1) included in the segment (A2) not containing an ionic group, larger content is more preferable; the content of 20 mol % or larger is further preferable, the content of 50 mol % or larger is more further preferable, and the content of 80 mol % or larger is most preferable. When the content is smaller than 20 mol %, the effect of the present invention on chemical stability and proton conductivity under low-humidification condition becomes insufficient in some cases, which is not favorable.

[Chemical formula 20]

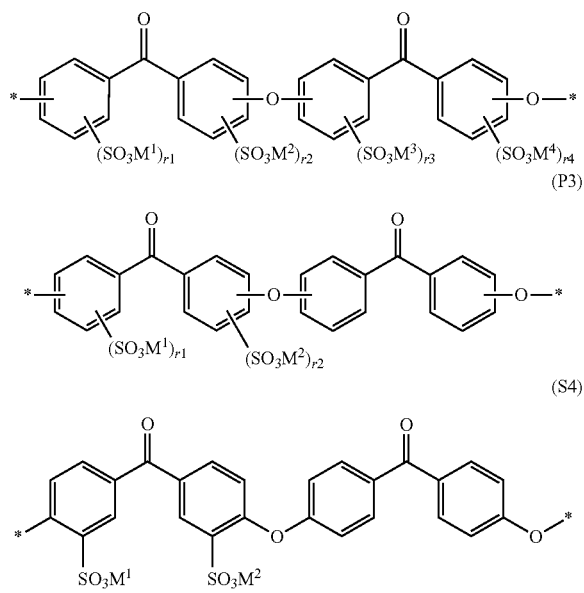

where, in the formulae (P2), (P3), and (S4), $M^1$ to $M^4$ each may represent hydrogen, metal cation, and ammonium cation $NR^{4+}$ (R is an arbitrary organic group); $M^1$ to $M^4$ may represent two or more kinds of groups; r1 to r4 are each independently an integer of 0 to 2; r1+r2 signifies an integer of 1 to 8; r1 to r4 may each be two or more kinds of values; and the symbol * signifies a bond moiety with the general formulae (P2), (P3), and (S4), or with other constituent unit.

A preferable example of the constituent unit that is caused to be copolymerized other than the constituent unit represented by the general formula (S1), as the segment (A1) containing an ionic group, includes an aromatic polyether-based polymer containing a ketone group and containing an ionic group.

The synthesis method for the segment (A1) containing an ionic group, used in the present invention, is not specifically limited if only the method is a method in which substantially sufficient molecular weight is obtained. For example, the synthesis can be done through the utilization of: an aromatic nucleophilic substitution reaction of an aromatic active dihalide compound and a divalent phenol compound; or an aromatic nucleophilic substitution reaction of a halogenated aromatic phenol compound.

As an aromatic active dihalide compound used for the synthesis of the segment (A1) containing an ionic group, the use, as a monomer, of a compound in which an ionic acid group is introduced into an aromatic active dihalide compound is preferred from the viewpoint of chemical stability, manufacturing cost, and availability of precision control of the amount of ionic group. Preferred examples of the monomer having sulfonic acid group as the ionic group can include, 3,3'-disulfonate-4,4'-dichlorodiphenylsulfone, 3,3'-disulfonate-4,4'-difluorodiphenylsulfone, 3,3'-disulfonate-4,4'-dichlorodiphenylketone, 3,3'-disulfonate-4,4'-difluorodiphenylketone, 3,3'-disulfonate-4,4'-dichlorodiphenylphenylphosphine oxide, 3,3'-disulfonate-4,4'-difluorodiphenylphenylphosphine oxide and the like, but these examples are not the limited ones. Among them, from the viewpoint of chemical stability and physical durability, more preferable ones are 3,3'-disulfonate-4,4'-dichlorodiphenylketone and 3,3'-disulfonate-4,4'-difluorodiphenylketone, and from the viewpoint of polymerization activity, the most preferable one is 3,3'-disulfonate-4,4'-difluorodiphenylketone.

From the viewpoint of proton conductivity and hydrolysis resistance, sulfonic acid group is most preferred as the ionic group, but the monomer having an ionic group used in the present invention may contain other ionic group.

The segment (A1) containing an ionic group synthesized using 3,3'-disulfonate-4,4'-dichlorodiphenylketone or 3,3'-disulfonate-4,4'-difluorodiphenylketone as the monomer having an ionic group, further contains the constituent unit represented by the general formula (p1), and the segment (A1) is favorably used. The aromatic polyether-based polymer has the high crystallinity characteristics of ketone group, and is a component having superior hot water resistance to the sulfone group, thus serving as an effective component in the material excellent in dimensional stability, mechanical strength, and physical durability, under high-temperature and high-humidity conditions, thereby being further preferably used. In the polymerization, that type of sulfonic acid group preferably takes the form of a salt with monovalent cation species. The monovalent cation species may be sodium, potassium, other metal species, various kinds of amines or the like, and they are not specifically limited. These aromatic active dihalide compounds can be used alone, and can be used with a combination of a plurality of aromatic dihalide compounds.

[Chemical formula 21]

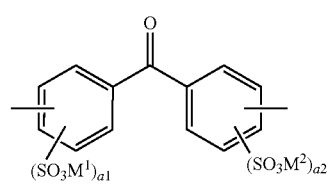

where, in the general formula (p1), $M^1$ and $M^2$ each represent hydrogen, metal cation, and ammonium cation $NR^{4+}$ (R is an arbitrary organic group); a1 and a2 each represent an integer of 1 to 4; and the constituent unit represented by the general formula (p1) may be arbitrarily substituted.

Furthermore, as to the aromatic active dihalide compound, the ionic group density can be controlled by copolymerization of the one containing an ionic group and the one not containing an ionic group. However, as to the segment (A1) containing an ionic group according to the present invention, the one not copolymerizing an aromatic active dihalide compound not containing an ionic group is more preferable from the viewpoint of securing continuity of the proton conduction pass.

Specific examples of more preferable aromatic active dihalide compound not containing an ionic group can include 4,4'-dichlorodiphenyl sulfone, 4,4'-difluorodiphenyl sulfone, 4,4'-dichlorodiphenyl ketone, 4,4'-difluorodiphenyl ketone, 4,4'-dichlorodiphenylphenylphosphine oxide, 4,4'-difluorodiphenylphenylphosphine oxide, 2,6-dichlorobenzonitrile, 2,6-difluorobenzonitrile and the like. Among them, 4,4'-dichlorodiphenyl ketone and 4,4'-difluorodiphenyl ketone are more preferable from the viewpoint of providing crystallinity, mechanical strength, physical durability and hot water resistance, and 4,4'- difluorodiphenyl ketone is the most preferable from the viewpoint of polymerization activity. These aromatic active dihalide compounds can be used alone, and can also be used together with a plurality of aromatic active dihalide compounds.

The block copolymer synthesized using 4,4'-dichlorodiphenyl ketone or 4,4'-difluorodiphenyl ketone as the aromatic active dihalide compound further contains the constitution moiety represented by the general formula (p2), and is preferably used. The constituent unit serves as a component that provides intermolecular cohesive force and crystallinity, thus serving as a material excellent in dimensional stability, mechanical strength, and physical durability under high-temperature and high-humidity conditions, and the constituent unit is preferably used.

[Chemical formula 22]

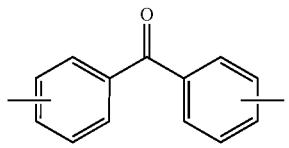

(p2)

where, the constituent unit represented by the general formula (p2) may be arbitrarily substituted, and does not contain an ionic group.

In addition, an example of the monomer not containing an ionic group, which can perform copolymerization, includes a halogenated aromatic hydroxy compound. Although the halogenated aromatic hydroxy compound is not specifically limited, there are included, as examples, 4-hydroxy-4'-chlorobenzophenone, 4-hydroxy-4'-fluorobenzophenone, 4-hydroxy-4'-chlorodiphenylsulfone, 4-hydroxy-4'-fluorodiphenylsulfone, 4-(4'-hydroxybiphenyl)(4-chlorophenyl)sulfone, 4-(4'-hydroxybiphenyl)(4-fluorophenyl)sulfone, 4-(4'-hydroxybiphenyl)(4-chlorophenyl)ketone, 4-(4'-hydroxybiphenyl)(4-fluorophenyl)ketone and the like. They can be used alone, and can be used as a mixture of two or more thereof. Furthermore, an aromatic polyether-based compound may be synthesized by causing these halogenated aromatic hydroxy compounds to react in the reaction between an activated dihalogenated aromatic compound and an aromatic dihydroxy compound.

As preferred examples of the constituent unit that is caused to be copolymerized other than the constituent unit represented by the general formula (S1), as the segment (A1) containing an ionic group, specifically preferable are aromatic polyether ketone-based polymer that includes the constituent unit represented by the general formulae (T1) and (T2) that contain the constituent unit represented by the general formulae (p1) and (p2).

[Chemical formula 23]

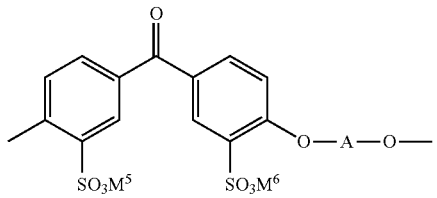

(T1)

-continued

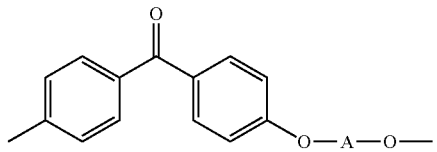

(T2)

where, in the general formulae (T1) and (T2), A represents a divalent organic group containing aromatic ring; $M^5$ and $M^6$ each represent hydrogen, metal cation, and ammonium cation $NR^{4+}$ (R is an arbitrary organic group); and A may be two or more kinds of groups.

By changing the composition ratio of the constituent units represented by the general formulae (T1) and (T2), the ion-exchange capacity can be controlled. When the quantities of constituent units represented by the general formulae (p1), (T1) and (T2) are expressed as p1, T1 and T2, respectively, the introduction quantity of p1 is, on the basis of the sum of moles of T1 and T2, preferably 75 mol % or larger, more preferably 90 mol % or larger, and most preferably 100 mol %. When the introduction quantity of p1 is smaller than 75 mol %, the formation of proton conduction pass becomes insufficient in some cases, which is not favorable.

Here, as the divalent organic group A containing aromatic ring in the general formulae (T1) and (T2), there can be used various kinds of divalent phenol compounds which can be used for polymerization of aromatic polyether-based polymer by the aromatic nucleophilic substitution reaction, but the divalent organic group A is not limited. In addition, these aromatic dihydroxy compounds to which further sulfonic acid group is introduced can be used as the monomer.

The number-average molecular weights of the segment (A1) containing an ionic group and the segment (A2) not containing an ionic group are related to the domain size of the phase-separated structure, and from the viewpoint of balance between the physical durability and the proton conductivity under low-humidification conditions, the number-average molecular weights of the segment (A1) and the segment (A2) are preferably 5,000 or larger, more preferably 10,000 or larger, and most preferably 15,000 or larger. In addition, the number-average molecular weight the reach is preferably 50,000 or smaller, more preferably 40,000 or smaller, and most preferably 30,000 or smaller.

The polymer electrolyte composition according to the present invention is specifically preferred as the polymer electrolyte form article. The term "polymer electrolyte form article" referred to in this Description means the formed article containing the polymer electrolyte composition of the present invention. The polymer electrolyte form article can be in various shapes depending on the uses, such as membrane (including film and film-like ones), plate, fiber, hollow fiber, particles, mass, fine pores, coating, and foamed one. Because of the improvement in freedom of polymer design and the improvement in various characteristics such as mechanical characteristics and solvent resistance, they can be applied in wide range of uses. Specifically, when the polymer electrolyte form article is membrane, the use is preferred.

When the polymer electrolyte composition of the present invention is used for the polymer electrolyte fuel cell, the composition is preferably used as the polymer electrolyte membrane and the electrode catalyst layer. Above all, the polymer electrolyte membrane is a suitable use. Because, when the composition is used for the polymer electrolyte fuel cell, it is normally used in a membrane state as the polymer electrolyte membrane and the binder of electrode catalyst layer. The polymer electrolyte composition of the present invention has high chemical stability, and thus the composition can also be preferably used specifically as the binder of electrode catalyst layer where electrochemical reaction occurs in the vicinity thereof.

The polymer electrolyte form article is applicable in various uses, such as medical use (extracorporeal circulation column, artificial skin, and the like), filter use, ion-exchange resin use (such as anti-chlorine reverse osmosis membrane), various structuring materials, electrochemical use, humidification membrane, antifogging membrane, antistatic membrane, solar cell membrane, and gas barrier material. Also the polymer electrolyte form article is suitable for artificial muscle and actuator material. Among them, the polymer electrolyte form article is more preferably used in various electrochemical uses. The electrochemical uses include fuel cell, redox flow battery, water electrolyzer, and chloroalkali electrolyzer. Among them, the fuel cell use is most preferable.

Next, the method of manufacturing the polymer electrolyte membrane according to the present invention will be described specifically.

In the conventional block copolymer including a segment containing an ionic group, a segment not containing an ionic group, and a linker moiety connecting the segments, not only the segment containing an ionic group but also the segment not containing an ionic group is formed of an amorphous polymer having solubility because of the limitation of synthesis, in which solubility to solvent is required at the time of polymerization and membrane-formation. The amorphous segment not containing an ionic group has poor cohesive force of polymer molecule chains, and thus when being formed in a membrane state, the amorphous segment has poor toughness, and cannot suppress the swelling of the segment containing an ionic group, and thus was not able to achieve satisfactory mechanical strength and physical durability. In addition, from the problem of thermal decomposition temperature of the ionic group, normally, the cast molding is used, and thus the crystalline polymer having poor solubility was not able to obtain a homogeneous and tough membrane in the cast molding.

The polymer electrolyte membrane of the present invention is structured by a block copolymer having each one or more of the segment (A1) containing an ionic group and the segment (A2) not containing an ionic group. Since the segment (A2) not containing an ionic group is a segment showing crystallinity, it can be manufactured by the steps of: forming a membrane of a precursor of the block copolymer to which a protective group is introduced at least into the segment (A2) not containing an ionic group; and then deprotecting at least a part of the protective group contained in the membrane. As to the block copolymer, processability tends to deteriorate because of the crystallization of polymer forming the domain, in comparison with the processability of the random copolymer, and thus it is preferable to introduce the protective group at least into the segment (A2) not containing an ionic group and to improve the processability. Also into the segment (A1) containing an ionic group, the protective group is preferably introduced, when the processability becomes poor.

Specific examples of the protective group used in the present invention are the ones commonly used in organic synthesis, and the protective group is a substituent which is temporarily introduced on the premise of being removed in the subsequent step, which can protect highly reactive functional group to make the group inactive in the subsequent reaction, and which can perform deprotection after the reaction, to thereby return the protected group to the original functional group. That is, the protective group forms a pair with the functional group being protected. There are cases where, for example, t-butyl group is used as the protective group of hydroxyl group, but when the same t-butyl group is introduced into the alkylene chain, the t-butyl group is not referred to as "the protective group". The reaction introducing the protective group is referred to as "the protection (reaction)", and the reaction removing the protective group is referred to as "the deprotection (reaction)".

Such protective reactions are, for example, described in detail in Theodora W. Greene, "Protective Groups in Organic Synthesis", U.S., John Wiley & Sons, Inc. 1981, and they can be preferably used. The reactions are appropriately selected in consideration of reactivity and yield of protection reaction and deprotection reaction, stability in a state of containing the protective group, manufacturing cost, and the like. In addition, the stage of introducing the protective group in the polymerization reaction may be monomer stage, oligomer stage, or polymer stage.

Examples of the protection reaction are: the method of protecting/deprotecting the ketone moiety at the ketal moiety; and the method of protecting/deprotecting the ketone moiety by a hetero atom-analog such as thioketal at the ketal moiety. These methods are described in Chapter 4 of above literature "Protective Groups in Organic Synthesis". There are further methods: the method of performing protection/deprotection between sulfonic acid and a soluble ester derivative; the method of performing protection/deprotection by introducing a t-butyl group as the soluble group into aromatic ring, and by removing the t-butyl group by an acid; and the like. However, these methods are not the limited ones, and any protective group can be preferably applied. From the viewpoint of improving solubility in ordinary solvents, an aliphatic group, specifically an aliphatic group containing ring portion is preferred as the protective group because of the large steric hindrance.

More preferable protection reaction includes, from the viewpoint of reactivity and stability, the method of protection/deprotection of ketone moiety at the ketal moiety; and the method of protection/deprotection of ketone moiety by a hetero atom-analog such as thioketal at the ketal moiety. In the ionic group-containing polymer (A) used in the polymer electrolyte composition and the polymer electrolyte membrane according to the present invention, more preferable constituent unit containing protective group is the one containing at least one selected from the general formulae (U1) and (U2).

[Chemical formula 24]

where, in the formulae (U1) and (U2), $Ar_9$ to $Ar_{12}$ are each an arbitrary divalent arylene group; $R_1$ and $R_2$ are each at least one kind of group selected from H and alkyl group; $R_3$ is an arbitrary alkylene group; E is O or S, each may represent two or more kinds of groups; the group represented by the formulae (U1) and (U2) may be arbitrarily substituted; the symbol * signifies the bond moiety with the general formulae (U1) and (U2) or other constituent unit.

Among these, from the viewpoint of odor, reactivity, stability, and the like of the compound, the most preferable is that E is O in the general formulae (U1) and (U2), that is, the method of protection/deprotection of ketone moiety at the ketal moiety is the most preferable.

In the general formula (U1), $R_1$ and $R_2$ are more preferably alkyl group from the viewpoint of stability, further preferably alkyl group having 1 to 6 of carbons, and most preferably alkyl group having 1 to 3 carbons. In addition, in the general formula (U2), from the viewpoint of stability, $R_3$ is preferably alkylene group having 1 to 7 carbons, that is, a group represented by $C_{n1}H_{2n1}$ (n1 is an integer of 1 to 7), and most preferably alkylene group having 1 to 4 carbons. Specific examples of $R_3$ include —$CH_2CH_2$—, —$CH(CH_3)CH_2$—, —$CH(CH_3)CH(CH_3)$—, —$C(CH_3)_2CH_2$—, —$C(CH_3)_2CH(CH_3)$—, —$C(CH_3)_2O(CH_3)_2$—, —$CH_2CH_2CH_2$—, —$CH_2C(CH_3)_2CH_2$— and the like, and these are not the limited ones.

Among the constituent units represented by the general formulae (U1) and (U2), from the viewpoint of stability such as hydrolysis resistance, the one having at least the general formula (U2) is preferably used. As to $R_3$ in the general formula (U2), the most preferable ones are at least one selected from the group consisting of —$CH_2CH_2$—, —$CH(CH_2)CH_2$—, and —$CH_2CH_2CH_2$—, from the point of stability and ease of synthesis.

In the general formulae (U1) and (U2), preferable organic groups as $Ar_9$ to $Ar_{12}$ are phenylene group, naphthylene group, and biphenylene group. These organic groups may be arbitrarily substituted. As the block copolymer used in the present invention, from the viewpoint of solubility and availability of raw material, both $Ar_{11}$ and $Ar_{12}$ in the general formula (U2) are preferably phenylene groups, and most preferably both $Ar_{11}$ and $Ar_{12}$ are p-phenylene groups.

In the present invention, the method of performing protection of the ketone moiety by ketal includes the method of causing a precursor compound having ketone group to react with a mono-functional and/or bi-functional alcohol in the presence of an acid catalyst. For example, the manufacture can be done by the reaction between 4,4'-dihydroxybenzophenone as the ketone precursor and mono-functional and/or bi-functional alcohol in a solvent of aliphatic or aromatic hydrocarbon in the presence of acid catalyst such as hydrogen bromide. The alcohol is an aliphatic alcohol having 1 to 20 carbons. An improvement method for manufacturing the ketal monomer used in the present invention is the reaction between 4,4'-dihydroxybenzophenone as the ketone precursor and bi-functional alcohol, in the presence of alkylorthoester and a solid catalyst.

In the present invention, the method of performing deprotection of at least a part of the ketone moiety protected by the ketal, to thereby set the part to the ketone moiety is not specifically limited. The deprotection reaction can be performed in the presence of water and acid under a homogeneous or heterogeneous condition, but from the viewpoint of mechanical strength, physical durability, and solvent resistance, the method of performing acid treatment after molding into membrane or the like is more preferable. Specifically, it is possible to deprotect the molded membrane by immersing it in an aqueous solution of hydrochloric acid or an aqueous solution of sulfuric acid. The concentration of acid and the temperature of aqueous solution can be adequately selected.

The weight ratio of the acidic aqueous solution required with respect to the polymer is preferably in a range of 1 to 100 fold, and furthermore a large volume of water can be used. The acid catalyst is used preferably at a concentration of 0.1 to 50% by weight to the existing water. Preferred acid catalyst includes: strong mineral acid (strong inorganic acid) such as hydrochloric acid, nitric acid, fluorosulfonic acid, and sulfuric acid; and strong organic acid such as p-toluenesulfonic acid and trifluoromethanesulfonic acid. The quantity of acid catalyst and of excessive water, the reaction pressure, and the like can be adequately selected depending on the thickness and the like of the polymer.

For example, with a membrane having a thickness of 25 μm, it is possible to readily deprotect nearly the total amount of the membrane by immersing the membrane in an acidic aqueous solution exemplified by aqueous solution of 6N hydrochloric acid and aqueous solution of 5% by weight of sulfuric acid, followed by heating the membrane from room temperature to 95° C. for 1 to 48 hours. Furthermore, even when the membrane is immersed in an aqueous solution of 1N hydrochloric acid for 24 hours at 25° C., substantially all the protective groups can be deprotected. However, as the condition of deprotection, the above methods are not limited, and there can be performed deprotection by using acidic gas, organic acid, or heat treatment.

In the synthesis of oligomer by the aromatic nucleophilic substitution reaction being conducted in order to obtain the segment to be used in the present invention, a polymer can be obtained by the reaction of the above monomer mixture in the presence of a basic compound. The polymerization can be performed at temperatures ranging from 0° C. to 350° C., and the temperatures from 50° C. to 250° C. are preferred. When the temperature is lower than 0° C., the reaction tends not to proceed sufficiently, and when the temperature is higher than 350° C., the polymer decomposition tends to start occurring. Although the reaction can be done without solvent, it is preferable to conduct the reaction in a solvent. Applicable solvents include non-protonic polar solvents, and the like such as N,N-dimethylacetoamide, N,N-dimethylformamide, N-methyl-2-pyrrolidone, dimethylsulfoxide, sulfolane, 1,3-dimethyl-2-imidazolidinone, and hexamethylsulfone triamide, but these solvents are not the limited ones, and any solvent can be applied if only the solvent can be used as a stable one in the aromatic nucleophilic substitution reaction. These organic solvents can be used alone or as a mixture of two or more thereof.

Examples of the basic compounds include sodium hydroxide, potassium hydroxide, sodium carbonate, potassium carbonate, sodium hydrogen carbonate, and potassium hydrogen carbonate, but they are not the limited ones, and any basic compound can be used as long as the compound can change the aromatic diols into the active phenoxide structure. In addition, in order to increase the nucleophilicity of the phenoxide, the addition of a crown ether such as 18-crown-6 is preferable. These crown ethers, in some cases, coordinate with sodium ions and potassium ions in the sulfonic acid group, to thereby improve the solubility to organic solvent, and can be favorably used.

In the aromatic nucleophilic substitution reaction, water is generated as a byproduct, in some cases. At this time, independent of the polymerization solvent, toluene or the like can be caused to coexist in the reaction system to remove the water from the system as an azeotrope. As the method of removing water from the reaction system, water-absorbent such as molecular sieve can be used.

The azeotropic agent to be used for removing reaction water or water introduced during the reaction is normally an arbitrary inactive compound which does not substantially interfere with the polymerization, which carries out co-distillation with water, and boils at temperatures ranging from about 25° C. to about 250° C. The normal azeotropic agent includes benzene, toluene, xylene, chlorobenzene, methylene chloride, dichlorobenzene, trichlorobenzene, cyclohexane and the like. Naturally, it is useful to select an azeotropic agent having lower boiling point than the boiling point of the bipolar solvent to be used. Although an azeotropic agent is normally used, the use of the azeotropic agent is not always required when the high reaction temperature, for example, 200° C. or higher is used, specifically when an inert gas is continuously sprayed onto the reaction mixture. Normally, the reaction is desirably conducted in a state where no oxygen exists in an inert atmosphere.

When the aromatic nucleophilic substitution reaction is conducted in a solvent, it is preferred to charge the monomer so that the concentration of polymer to be obtained is 5 to 50% by weight. When the concentration is smaller than 5% by weight, the degree of polymerization tends not to increase. On the other hand, when the concentration is larger than 50% by weight, the viscosity of reaction system becomes excessively high, which tends to result in difficulty in post-treatment of the reaction products.

After the completion of the polymerization reaction, the solvent is removed by vaporization from the reaction solution, and the desired polymer is obtained after rinsing the residue, as necessary. In addition, it is also possible to obtain the polymer by the processes of: adding the reaction solution to a solvent which has low polymer solubility and high solubility of by-product inorganic salt, to thereby remove the inorganic salt and to precipitate the polymer as solid; and filtering the sediment. The recovered polymer is rinsed by, as necessary, water, alcohol, or other solvents, followed by being dried. When the desired molecular weight is obtained, the halide or the phenoxide terminal group can be caused to react by introducing a phenoxide or a halide terminal-blocking agent which forms a stable terminal group, in some cases.

The molecular weight of thus obtained ionic group-containing polymer (B)
used in the present invention is, as the weight-average molecular weight in terms of polystyrene, in a range of 1,000 to 5 million, preferably 10,000 to 500,000. When the molecular weight is smaller than 1,000, any of the mechanical strength including cracking, the physical durability, and the solvent resistance, of the molded membrane may be insufficient. On the other hand, when the molecular weight exceeds 5 million, there arise problems such as insufficient solubility and high solution viscosity, thereby resulting in poor processability, and the like.

Meanwhile, the chemical structure of the ionic group-containing polymer used in the present invention can be confirmed by infrared absorption spectra: S=O absorption of 1,030 to 1,045 $cm^{-1}$ and 1,160 to 1,190 $cm^{-1}$; C—O—C absorption of 1,130 to 1,250 $cm^{-1}$; C=O absorption at 1,640 to 1,660 $cm^{-1}$ and the like, and these composition ratios can be determined by the neutralization titration of sulfonic acid group and by the elemental analysis. In addition, nuclear magnetic resonance spectra ($^1$H-NMR) make it possible to confirm the structure by the peak of aromatic proton of 6.8 to 8.0 ppm, for example. Furthermore, the position of sulfonic acid group and the arrangement thereof can be confirmed by the solution $^{13}$C-NMR and the solid $^{13}$C-NMR.

As to the block copolymer used in the present invention, there can be observed the co-continuous phase separation structure by using a transmission electron microscope. By controlling the phase separation structure of the block copolymer, that is, the aggregation state and the shape of the segment (A1) containing an ionic group and the segment (A2) not containing an ionic group, excellent proton conductivity can be achieved even under low-humidification conditions. The phase separation structure can be analyzed by transmission electron microscope (TEM), atomic force microscope (AFM), and the like.

In the polymer electrolyte composition of the present invention, the phosphorus-containing additive can be located concentrating in the hydrophilic domain formed by the segment containing an ionic group and in the hydrophobic domain formed by the segment not containing an ionic group, by adequately selecting the polarity (hydrophilic and hydrophobic properties) of the phosphorus-containing additive. It is considered that hydroxy radical and hydrogen peroxide usually have high hydrophilicity, and exist in the hydrophilic domain formed by the segment containing an ionic group, thus cutting the segment. Consequently, the hydrophilic antioxidant is effective in order to stabilize the segment containing an ionic group. On the other hand, the hydrophobic domain formed by the segment not containing an ionic group is a component that contributes to the mechanical strength, thus the hydrophobic domain is considered to have an effect of improving the physical durability by placing the hydrophobic antioxidant thereto. The combined use of these domains is also preferable as necessary.

Preferred block copolymer used in the present invention is the one allowing observation of the phase-separation structure by using transmission electron microscope (TEM) at a magnification of 50,000, and giving 8 nm or larger and 100 nm or smaller average interlayer distance or average interparticle distance determined by image-processing. Among them, 10 nm or larger and 50 nm or smaller average interlayer distance or average interparticle is more preferable and 15 nm or larger and 30 nm or smaller thereof is most preferable. When the phase separation structure cannot be observed through the transmission electron microscope, or when the average interlayer distance or the average interparticle distance is smaller than 8 nm, the continuity of ion channel is insufficient and conductivity becomes insufficient in some cases, which is unfavorable. In addition, when the interlayer distance exceeds 5,000 nm, the mechanical strength and the dimensional stability become poor in some cases, which is unfavorable.

The block copolymer used in the present invention is characterized in having crystallinity while keeping the phase-separation structure, and is confirmed to exhibit crystallinity by the differential scanning calorimetry (DSC) or by the wide angle X-ray diffractometry. That is, the block copolymer is one that exhibits a crystallization heat of 0.1 J/g or larger measured by the differential scanning calorimetry, or exhibits a degree of crystallinity of 0.5% or larger measured by the wide angle X-ray diffraction.

The term "having crystallinity" referred to herein means that the polymer can be crystallized when heated, has a crystalline property, or has already been crystallized. In addition, the term "amorphous polymer" means a polymer which is not a crystalline polymer and which does not substantially progress the crystallization. Accordingly, even for a crystalline polymer, when the polymer does not sufficiently progress the crystallization, the polymer is in an amorphous state in some cases.

The method of forming the polymer electrolyte composition of the present invention into a polymer electrolyte membrane is not specifically limited, and there can be used a method of forming a membrane in a solution state or in a molten state at the stage of having a protective group such as ketal. In the former case, there can be exemplified a method of forming a membrane by dissolving the polymer electrolyte material in a solvent such as N-methyl-2-pyrrolidone, and performing flow-casting coating of the solution on a glass plate or the like, followed by removing the solvent.

Applicable solvent used for the membrane-formation is the one that dissolves the polymer electrolyte composition and then allows removing thereof. Examples of the solvents preferably used are: non-protonic polar solvent such as N,N-dimethylacetoamide, N,N-dimethylformamide, N-methyl-2-pyrrolidone, dimethylsulfoxide, sulfolane, 1,3-dimethyl-2-imidazolidinone, and hexamethylphosphone triamide; ester-based solvent such as γ-butylolactone and butylacetate; carbonate-based solvent such as ethylene carbonate and propylene carbonate; alkylene glycol monoalkylether such as ethyleneglycol monomethylether, ethyleneglycol monoethylether, propyleneglycol monomethylether, and propyleneglycol monoethylether; alcohol-based solvent such as isopropanol; water; and a mixture thereof. Among these, non-protonic polar solvent is preferred because of the highest solubility. In addition, in order to increase the solubility of the segment (A1) containing an ionic group, the addition of crown ether such as 18-crown-6 is preferred.

In addition, in the present invention, when the block copolymer is used, the selection of solvent is important for the phase-separation structure, and a mixed use of the non-protonic polar solvent with a solvent having low polarity is also a preferable method.

In order to obtain tough membrane, a preferred method is to subject the polymer solution prepared so as to give a necessary solid concentration, to normal pressure filtration or positive pressure filtration, and to thereby remove a foreign substance from the polymer electrolyte solution. Although the filter medium used herein is not specifically limited, glass filter and metallic filter are preferable. For the filtration, the minimum filter pore size allowing the polymer solution to pass therethrough is preferably 1 µm or smaller. Unless the filtration is performed, inclusion of a foreign substance occurs, which is unfavorable because membrane breakage occurs and durability deteriorates.

Next, thus obtained polymer electrolyte membrane is preferably subjected to heat treatment in a state where at least a part of the ionic groups is a metal salt. When the polymer electrolyte composition used is polymerized in a metal salt state, it is preferable to form the membrane and to perform the heat treatment in that condition. The metal of the metallic salt is the one capable of forming a salt with a sulfonic acid, and from the viewpoint of price and environmental load, the preferred metal includes Li, Na, K, Rb, Cs, Mg, Ca, Sr, Ba, Ti, V, Mn, Fe, Co, Ni, Cu, Zn, Zr, Mo, and W. Among these, more preferable ones are Li, Na, K, Ca, Sr, and Ba, and further more preferable ones are Li, Na, and K.

The heat treatment temperature is preferably in a range of 80° C. to 350° C., more preferably 100° C. to 200° C., and particularly preferably 120° C. to 150° C. The heat treatment time is preferably 10 seconds to 12 hours, more preferably 30 seconds to 6 hours, and particularly preferably 1 minute to 1 hour. When the heat treatment temperature is excessively low, the mechanical strength and physical durability become insufficient in some cases. On the other hand, when the heat treatment temperature is excessively high, the chemical decomposition of the membrane material proceeds in some cases. When the heat treatment time is shorter than 10 seconds, the effect of heat treatment becomes insufficient. In contrast, when the heat treatment time exceeds 12 hours, the membrane material tends to deteriorate. The polymer electrolyte membrane obtained by the heat treatment can be proton-substituted by immersion into an acidic aqueous solution, as necessary. The polymer electrolyte membrane of the present invention makes it possible to simultaneously achieve a better balance of proton conductivity and physical durability by molding in this way.

The method of converting the polymer electrolyte composition used in the present invention into a membrane is performed by the processes of: forming the membrane constituted by the polymer electrolyte composition by the above method; and then deprotecting at least a part of the ketone moiety being protected by ketal, to thereby obtain the ketone moiety. According to the method, it is possible to perform solution membrane-formation of the block copolymer containing the block not containing an ionic group which is poor in solubility, and to thereby simultaneously achieve the proton conductivity, mechanical strength, and physical durability.

The thickness of the polymer electrolyte membrane of the present invention is suitably used in a range of preferably 1 to 2,000 µm. In order to attain practical-use level of mechanical strength and physical durability of the membrane, the thickness is preferably larger than 1 µm. In order to decrease the membrane resistance, or to improve the power generation performance, the thickness is preferably smaller than 2,000 µm. More preferred membrane thickness range is from 3 to 50 µm, particularly preferable range is from 10 to 30 µm. That membrane thickness can be controlled by the solution concentration or by the coating thickness on the substrate.

In addition, to the polymer electrolyte membrane obtained in the present invention, there can be further added additives such as crystallization nucleating agent, plasticizer, stabilizer, antioxidant, mold-releasing agent and the like, used for ordinary polymer compounds, within a range not contrary to the object of the present invention.

Furthermore, to the polymer electrolyte membrane obtained in the present invention, there can be added various polymers, elastomers, fillers, fine particles, various additives, and the like, within a range not adversely affecting the above characteristics, in order to enhance the mechanical strength, heat stability, processability and the like. In addition, the polymer electrolyte membrane may be reinforced with fine porous film, nonwoven cloth, mesh, and the like.

The polymer electrolyte fuel cell makes use of a hydrogen ion-conductive polymer electrolyte membrane as the electrolyte membrane, and has a structure of stacking a catalyst layer, an electrode substrate, and a separator, alternately, on both sides of the membrane. Among them, the one in which the catalyst layer is stacked on both sides of the electrolyte membrane, (that is, the layer structure of catalyst layer/electrolyte membrane/catalyst layer) is called "the catalyst-coated electrolyte membrane (CCM, catalyst coated membranes)", and the one in which the catalyst layer and the gas-diffusion substrate are alternately stacked on both sides of the electrolyte membrane (that is, the stacked structure of gas-diffusion substrate/catalyst layer/electrolyte membrane/catalyst layer/gas-diffusion substrate) is called the "electrode-electrolyte membrane joined assembly (MEA, membrane electrode assemblies)".

A common method of manufacturing the catalyst-coated electrolyte membrane is the coating method of coating and drying a catalyst layer paste composition for forming the catalyst layer on the surface of the electrolyte membrane. However, this coating method causes swelling and deformation of the electrolyte membrane caused by the solvent such as water or alcohol, thus raising a problem of difficulty in forming the desired catalyst layer on the surface of the electrolyte membrane. Furthermore, in the drying process, the electrolyte membrane is also exposed to high temperature atmosphere, thereby resulting in raising a problem of thermal expansion or the like and deformation. In order to solve the problem, there is proposed a method of stacking the catalyst layer on the electrolyte membrane (transfer method), in which only the catalyst layer is formed on the substrate in advance, and then the catalyst layer is stacked (for example, Japanese Patent Laid-Open No. 2009-9910).

The polymer electrolyte membrane obtained in the present invention has toughness and has excellent solvent resistance because of its crystallinity, and thus can specifically be preferably used also as the catalyst layer-coated electrolyte membrane by any of the coating method and the transfer method.

The method of manufacturing MEA by hot press is not specifically limited, and there can be applied a known method such as "Chemical Plating Methods", Journal of Electrochemistry, 1985, 53, p. 269, (Electrochemical Society of Japan), and "Hot press joining of gas-diffusion electrode", Electrochemical Science and Technology, 1988, 135, 9, p. 2209.

When the integration is performed by hot press, the temperature and the pressure may be adequately selected depending on the thickness of electrolyte membrane, the water content, the catalyst layer, and the electrode substrate. In addition, according to the present invention, press-composite can be applied even when the electrolyte membrane is in a dry state or in a state of absorbing water. Specific press method includes roll press that specifies pressure and clearance, flat press that specifies pressure and the like, and from the viewpoint of industrial productivity and suppression of thermal decomposition of polymer material containing an ionic group, the press is preferably performed in a temperature range of 0° C. to 250° C. From the viewpoint of protection of electrolyte membrane and of electrode, the press is preferably performed under lower pressure as much as possible, and in the case of flat press, 10 MPa or smaller pressure is preferred. A preferred selectable method is, from the viewpoint of prevention of short-circuit of anode and cathode electrodes, to join the electrode and the electrolyte membrane to thereby form the fuel cell without applying composite-formation by the hot press process. With that method, when power generation is repeated as the fuel cell, the deterioration of electrolyte membrane presumably originated from the short-circuit position tends to be suppressed, which improves the durability of fuel cell.

Furthermore, the intended uses of the polymer electrolyte fuel cell using the polymer electrolyte composition and the polymer electrolyte membrane of the present invention are not specifically limited, but power supply source to mobile body is a preferred one. In particular, preferred uses are substitution of conventional primary cell or rechargeable cell, or hybrid power sources therewith, and include: handy equipment such as cell phone, personal computer, PDA, TV, radio, music player, game player, head set, and DVD player; various robots of human type and animal type for industrial use; household electric appliances such as cordless vacuum cleaner; toys; power source of mobile body such as motor bicycle, motorbike, automobile, bus, truck, ship, and railway; and stationary power generator.

EXAMPLES

Hereinafter, the present invention will be described in more detail referring to examples, but the present invention is not limited by these examples. The conditions for measuring the physical properties are as follows.

(1) Ion-Exchange Capacity (IEC)

The ion-exchange capacity was measured by neutralization titration described in the following (i) to (iv). The measurements were performed three times, and then the average of them was taken.

(i) There was wiped off the moisture on the surface of the electrolyte membrane on which proton substitution was performed and which was fully rinsed by pure water, and then the membrane was dried for 12 hours in vacuum at 100° C. After that, the dry weight of the electrolyte membrane was obtained.

(ii) To the electrolyte membrane, there was added 50 mL of aqueous solution of 5% by weight of sodium sulfate, and the resultant solution was allowed to stand for 12 hours for conducting ion-exchange.

(iii) The generated sulfuric acid was titrated using aqueous solution of 0.01 mol/L sodium hydroxide. To the solution, commercially available 0.1 w/v % phenolphthalein solution for titration was added as the indicator, and the end point was set to be a point at which the color turns light reddish violet.

(iv) The ion-exchange capacity was obtained by the following formula.

Ion-exchange capacity (meq/g)=[Concentration of aqueous solution of sodium hydroxide (mmol/mL)×(Titration amount (mL))]/[Dry weight of sample (g)]

(2) Proton Conductivity

The membrane-shaped sample was immersed for 24 hours in pure water at 25° C. Then the sample was held in a thermo-hygrostat at 80° C. and at a relative humidity of 25 to 95% for each 30 minutes at individual steps. After that, the proton conductivity was measured by the controlled potential AC impedance method.

The measurement apparatus used was an electrochemical measurement system of Solartron Inc. (Solartron 1287 Electrochemical Interface and Solartron 1255B Frequency Response Analyzer). The Controlled potential impedance measurement was performed by the 2-probe method and the proton conductivity was obtained. The AC amplitude was 50 mV. The sample used was a membrane having 10 mm in width and 50 mm in length. The measurement jig was fabricated by phenol resin, and the measurement portion was opened. The electrode used was platinum plates (2 plates each having a thickness of 100 μm). The electrodes were arranged so as the distance therebetween to become 10 mm and so as to be in parallel each other and be orthogonal to the longitudinal direction of the sample membrane, on front and rear side of the sample membrane.

(3) Number-Average Molecular Weight and Weight-Average Molecular Weight

The number-average molecular weight and the weight-average molecular weight of polymer were measured by GPC. As the integrated analyzer of ultraviolet ray detector and differential diffractometer, HLC-8022GPC manufactured by TOSOH Corporation was applied. As the GPC column, two columns of TSK gel Super HM-H (6.0 mm in inner diameter, 15 cm in length, manufactured by TOSOH Corporation) were used. The measurement was done using N-methyl-2-pyrrolidone solvent (N-methyl-2-pyrrolidone solvent containing 10 mmol/L of lithium bromide) under a condition of 0.1% by weight of sample concentration, 0.2 mL/min of flow rate, at 40° C. The number-average molecular weight and the weight-average molecular weight were obtained in terms of standard polystyrene.

(4) Membrane Thickness

The measurement of membrane thickness was performed by ID-C112 manufactured by Mitsutoyo Co. mounted on a granite comparator stand BSG-20 manufactured by Mitsutoyo Co.

(5) Measurement Method of Purity

Quantitative analysis was performed by Gas chromatography (GC) under the following conditions.
Column: DB-5 (manufactured by J&W Inc.) L=30 m, φ=0.53 mm, D=1.50 μm
Carrier: Helium (Line velocity=35.0 cm/sec)
Analytical condition
    Inj. temp.; 300° C.
    Detect. temp.; 320° C.
    Oven; 50° C.×1 min
    Rate; 10° C./min
    Final; 300° C.×15 min
    SP ratio; 50:1

(6) Measurement of Added Quantity of Antioxidant

The added quantity of antioxidant in the electrolyte membrane was evaluated by Inductively Coupled Plasma (ICP) Emission spectrophotometric analysis. An electrolyte membrane was cut to a size of 5 cm×5 cm, which cut sample was dried at 110° C. under reduced pressure for 2 hours. The dried sample was weighed precisely and then was allowed to standing at 550° C. for 2 days. The residual ash was dissolved in an aqueous solution of 0.1N nitric acid to completely extract the additive. Thus treated liquid was analyzed by the ICP Emission spectrophotometry to determine the quantity of phosphorus and various metal elements, thereby the quantification of the antioxidant was executed.

(7) Hot Water Resistance of Antioxidant

The hot water resistance of the antioxidant was evaluated by determining the residual rate after immersion in 95° C. hot water. The electrolyte membrane was cut to two rectangular pieces of each about 5 cm in length and about 10 cm in width. The cut sample was immersed in 95° C. hot water for 8 hours to elute the antioxidant. The electrolyte membrane before and after the immersion in hot water was cut to a size of 5 cm×5 cm, respectively. Each of the cut sample was analyzed by the ICP Emission spectrophotometry to determine the content of the antioxidant, and the hot water resistance was evaluated as the residual rate of the antioxidant.

(8) Nuclear Magnetic Resonance (NMR) Spectra

The $^1$H-NMR measurement was performed under the following conditions, to confirm the structure and to quantify the molar composition ratio of the segment (A1) containing an ionic group to the segment (A2) not containing an ionic group. The molar composition ratio was calculated from the integral peak values appearing at 8.2 ppm (originated from disulfonate-4,4'-difluorobenzophenone) and 6.5 to 8.0 ppm (originated from all aromatic protons except for disulfonate-4,4'-difluorobenzophenone).

Apparatus: EX-270 manufactured by JOEL Ltd.
Resonance frequency: 270 MHz ($^1$H-NMR)
Measurement temperature: Room temperature
Dissolving solvent: DMSO-d6
Internal reference substance: TMS (0 ppm)
Cumulative number: 16 times (9) Chemical Stability (A) Molecular Weight Holding Rate As to an electrolyte membrane soluble in N-methylpyrrolidone (NMP), the electrolyte membrane was deteriorated by the following method, and the chemical stability was evaluated by making a comparison of the molecular weight between before and after the degradation test.

There were prepared a pair of commercially available electrodes, "ELAT (registered trademark, gas-diffusion electrode for fuel cell, manufactured by BASF GmbH) LT120ENSI" with 5 g/m$^2$ Pt, each cut to 5 cm square. The electrodes were overlapped facing each other so as to sandwich an electrolyte membrane as the fuel electrode and the oxidation electrode. Hot pressing was performed for 3 minutes at a temperature of 150° C. and a pressure of 5 MPa, and thus the membrane electrode assembly for evaluation was obtained.

Thus obtained membrane electrode assembly was positioned on JARI Standard Cell "Ex-1" (25 cm$^2$ of electrode area, manufactured by EIWA Corporation). While keeping the temperature of the assembly at 80° C., hydrogen gas in a low-humidification state (70 mL/min, back pressure 0.1 MPaG) and air (174 mL/min, back pressure 0.05 MPaG) were introduced to the Cell, and thus accelerated degradation test in open circuit was performed. After operating the Cell of fuel cell for 200 hours under the above conditions, the membrane electrode assembly was taken out, which was then immersed in a mixed solution of ethanol and water, and was further treated by ultrasonic wave and the catalyst layer was removed. Then, the molecular weight of remaining polymer electrolyte membrane was measured for evaluation as the molecular weight holding rate.

(B) Open Circuit Holding Time

As to an electrolyte membrane insoluble in NMP, the electrolyte membrane was deteriorated by the following method and the chemical stability was evaluated by comparing the holding time of the open circuit voltage.

A membrane electrode assembly was produced using a similar method to the above, and the assembly was placed on the evaluation cell. Then, under similar conditions to the above, the accelerated degradation test in open circuit was performed. The time until the open circuit voltage decreased to 0.7 V was evaluated as the open circuit holding time.

(C) Voltage Holding Rate

When even the above (B) evaluation of open circuit holding time made it possible to maintain 0.7 V or larger voltage for 3,000 hours or longer period, the evaluation was stopped, and the chemical durability was evaluated as the voltage holding rate by making a comparison between the initial voltage and the voltage after 3,000 hours.

Synthesis Example 1

Synthesis of 2,2-bis(4-hydroxyphenyl)-1,3-dioxolane (K-DHBP) Represented by the Following General Formula (G1)

[Chemical formula 25]

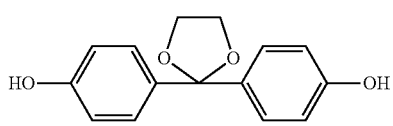
(G1)

To a 500 mL flask equipped with an agitator, a thermometer, and a distilling tube, there were added 49.5 g of 4,4'-dihydroxybenzophenone (DHBP), 134 g of ethyleneglycol, 96.9 g of ortho-trimethyl formate, and 0.50 g of p-toluenesulfonic acid hydrate, to thereby be dissolved. The solution was agitated for 2 hours while being kept at the temperature of 78° C. to 82° C. Furthermore, the internal temperature was gradually increased to 120° C. and the heating was continued until the distilling of methyl formate, methanol, and orthotrimethyl formate completely stops.

After cooling of the reaction solution to room temperature, the reaction solution was diluted by ethyl acetate, and then the organic layer was rinsed with 100 mL of 5% aqueous solution of potassium carbonate. After separating the solution, the solvent was distilled out. 80 mL of dichloromethane was added to the residue, crystal was deposited, and then after filtration and drying, 52.0 g of 2,2-bis(4-hydroxyphenyl)-1,3-dioxolane was obtained. Through the GC analysis of the crystal, 99.8% of 2,2-bis(4-hydroxyphenyl)-1,3-dioxolane and 0.2% of 4,4'-dihydroxybenzophenone were confirmed.

Synthesis Example 2

Synthesis of disodium 3,3'-disulfonate-4,4'-difluorobenzophenone Represented by the Following General Formula (G2)

[Chemical formula 26]

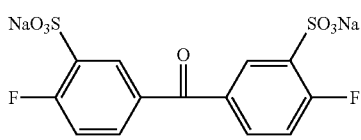
(G2)

A 109.1 g of 4,4'-difluorobenzophenone (Aldrich reagent) was caused to react in 150 mL of oleum (50% SO$_3$) (reagent of Wako Pure Chemical Industries, Ltd.) for 10 hours at 100° C. Then, the solution was gradually poured into a large volume of water, and after neutralizing the solution by using NaOH, 200 g of sodium chloride was added and the synthesized product was precipitated. The precipitated product obtained was separated by filtration, followed by recrystallization by using ethanol aqueous solution, and thus there was obtained disodium 3,3'-disulfonate-4,4'-difluorobenzophenone represented by the general formula (G2). The purity was 99.3%. The structure was confirmed by $^1$H-NMR. The impurities were quantitatively analyzed by capillary electrophoresis (organic substances) and by ion chromatography (inorganic substances).

Synthesis Example 3

Synthesis of Oligomer a1' not Containing an Ionic Group, Represented by the Following General Formula (G3)

[Chemical formula 27]

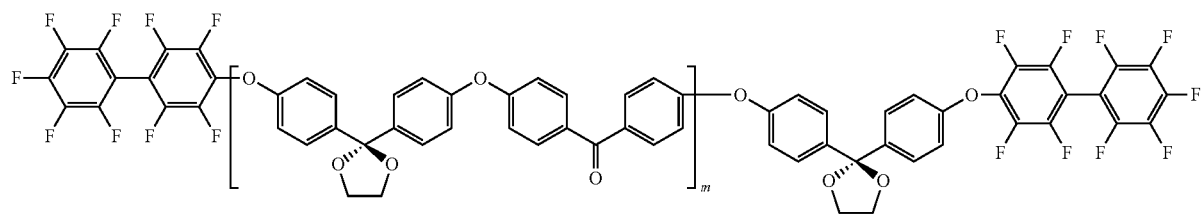
(G3)

where, in the formula (G3), m is a positive integer.

To a 1000 mL three neck flask equipped with an agitator, a nitrogen gas inlet tube, and a Dean-Stark trap, there were added 16.59 g of potassium carbonate (Aldrich reagent, 120 mmol), 25.8 g of K-DHBP (100 mmol) obtained in the Synthesis Example 1, and 20.3 g of 4,4'-difluorobenzophenone (Aldrich reagent, 93 mmol). After nitrogen purge, the resultant content was dewatered in 300 mL of N-methylpyrrolidone (NMP) and 100 mL of toluene at 160° C. Again, the resultant content was heated and the toluene was removed, then was polymerized for 1 hour at 180° C. Purification was performed by reprecipitation through the use of a large quantity of methanol, and thus there was obtained the oligomer a1 not containing an ionic group (terminal OM group; meanwhile, the symbol M in the OM group signifies Na or K, and the subsequent expression follows this example). The number-average molecular weight was 10,000.

To a 500 mL three neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer a1 not containing an ionic group (terminal OM group). After nitrogen purge, the resultant content was dewatered at 100° C. in 100 mL of N-methylpyrrolidone (NMP) and 30 mL of cyclohexane, and then the resultant content was heated and the cyclohexane was removed. Furthermore, 4.0 g of decafluorobiphenyl (Aldorich reagent, 12 mmol) was added and the solution was caused to react for 1 hour at 105° C. Purification was performed by reprecipitation through the use of a large quantity of isopropyl alcohol, and thus there was obtained the oligomer a1' not containing an ionic group (terminal fluoro group), represented by the formula (G3). The number-average molecular weight was 11,000, and the number-average molecular weight of the oligomer a1' not containing an ionic group was obtained as 10,400 (subtracting the linker moiety (molecular weight of 630)).

Synthesis of Oligomer a2 Containing an Ionic Group, Represented by Following the General Formula (G4)

[Chemical formula 28]

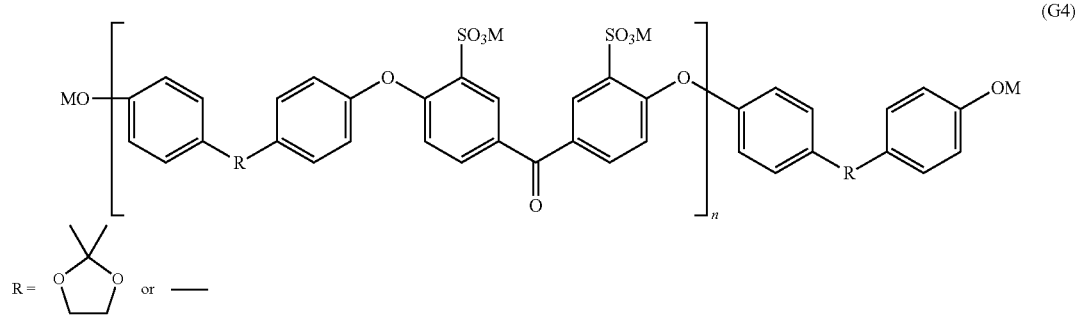

(G4)

where, in the formula (G4), M is Na or K.

To a 1000 mL three neck flask equipped with an agitator, a nitrogen gas inlet tube, and a Dean-Stark trap, there were added 27.6 g of potassium carbonate (Aldrich reagent, 200 mmol), 12.9 g (50 mmol) of K-DHBP obtained in the Synthesis Example 1, 9.3 g of 4,4'-biphenol (Aldrich reagent, 50 mmol), 39.3 g (93 mmol) of disodium 3,3'-disulfonate-4,4'-difluorobenzophenone obtained in the Synthesis Example 2, and 17.9 g of 18-crown-6-ether (82 mmol, Wako Pure Chemical Industries, Ltd.) After nitrogen purge, the resultant content was dewatered in 300 mL of N-methylpyrrolidone (NMP) and 100 mL of toluene at 170° C., and then the resultant content was heated and the toluene was removed. The resultant content was polymerized for 1 hour at 180° C. Purification was performed by reprecipitation through the use of a large quantity of isopropyl alcohol, and thus there was obtained the oligomer a2 containing an ionic group (terminal OM group), represented by the formula (G4). The number-average molecular weight was 16,000.

Synthesis of Polyketalketone (PKK)-Based Block Copolymer B1 Containing: Oligomer a2 as the Segment (A1) Containing an Ionic Group; Oligomer a1 as the Segment (A2) not Containing an Ionic Group; and Octafluorobiphenylene as the Linker Moiety To a 500 mL three neck flask equipped with an agitator, a nitrogen gas inlet tube, and a Dean-Stark trap, there were added 0.56 g of potassium carbonate (Aldrich reagent, 4 mmol), and 16 g (1 mmol) of the oligomer a2 containing an ionic group (terminal OM group). After nitrogen purge, the resultant content was dewatered at 100° C. in 100 mL of N-methylpyrrolidone (NMP) and 30 mL of cyclohexane, and then the resultant content was heated and the cyclohexane was removed. Furthermore, the addition of 11 g (1 mmol) of oligomer a1' not containing an ionic group (terminal fluoro group) causes the solution to react for 24 hour at 105° C. Purification was performed by reprecipitation through the use of a large quantity of isopropyl alcohol, and thus there was obtained the block copolymer b1. The weight-average molecular weight was 330,000.

The block copolymer b1 contained 50 mol % of constituent unit represented by the general formula (S1) as the segment (A1) containing an ionic group, and 100 mol % of constituent unit represented by the general formula (S2) as the segment (A2) not containing an ionic group.

The ion-exchange capacity obtained from neutralization titration was 1.8 meq/g when the block copolymer b1 itself was used as the polymer electrolyte membrane, the molar composition ratio (A1/A2) obtained from $^1$H-NMR was 56 mol/44 mol=1.27, and no residual ketal group was able to be confirmed.

Synthesis Example 4

Synthesis of Polyethersulfone (PES)-Based Block Copolymer Precursor b2', Structured by the Segment Represented by the Following Formula (G6) and the Segment Represented by the Following Formula (G7)

There were mixed 1.62 g of nickel chloride anhydride and 15 mL of dimethylsulfoxide, and the mixture was adjusted to 70° C. 2.15 g of 2,2'-bipyridyl was added to the mixture, and the resultant mixture was then agitated at the same temperature for 10 minutes and a nickel-containing solution was obtained.

Here, a solution was obtained by dissolving 1.49 g of 2,5-dichlorobenzenesulfonic acid (2,2-dimethylpropyl) ester and 0.50 g of polyethersulfone represented by the following formula (G5) (Sumica Excel PES5200P, Mn=40,000, Mw=94,000, manufactured by Sumitomo Chemical Co., Ltd.) in 5 mL of dimethylsulfoxide. Furthermore, 1.23 g of zinc powder was added to the solution and the temperature of the resultant solution was adjusted to 70° C. The above-described nickel-containing solution was poured to the solution, and polymerization reaction was performed at 70° C. for 4 hours. The reaction mixture was added to 60 mL of methanol, and further 60 mL of 6 mol/L hydrochloric acid was added for agitation of the mixture for 1 hour. The deposited solid was separated by filtration, and the resultant solid was dried, and 1.62 g of a gray-white block copolymer precursor b2' (polyarylene precursor) containing the segments represented by the following formula (G6) and the following formula (G7) was obtained at a yield of 99%. The weight-average molecular weight was 190,000.

[Chemical formula 29]

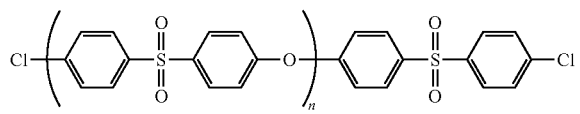

(G5)

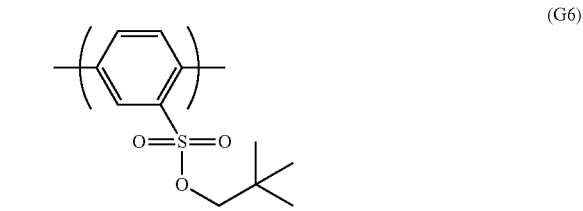

(G6)

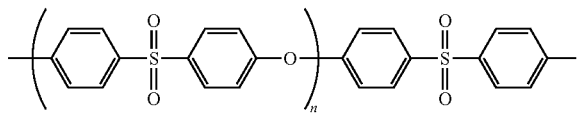

(G7)

Synthesis Example 5

Synthesis of Polyethersulfone (PES)-Based Block Copolymer Precursor b2, Structured by the Segment Represented by the Above Formula (G7) and the Segment Represented by the Following Formula (G8)

0.23 g of the block copolymer precursor b2' obtained in Synthesis Example 4 was added to a mixed solution of 0.16 g of lithium bromide mono-hydrate and 8 mL of N-methyl-2-pyrrolidone, and the mixture was caused to react at 120° C. for 24 hours. The reaction mixture was poured in 80 mL of 6 mol/L of hydrochloric acid for agitation for 1 hour. The deposited solid was separated by filtration. The resultant solid was dried and a gray-white block copolymer b2 structured by the segment represented by the formula (G7) and the segment represented by the following formula (G8) was obtained. The weight-average molecular weight of thus obtained polyarylene was 170,000.

When the block copolymer b2 itself was the polymer electrolyte membrane, the ion-exchange capacity obtained by the neutralization titration was 2.0 meq/g.

[Chemical formula 30]

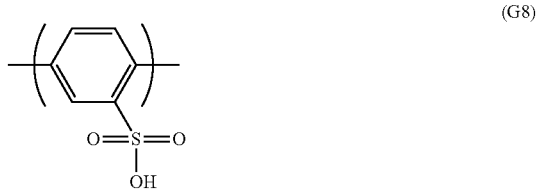

(G8)

Synthesis Example 6

Synthesis of Hydrophobic Oligomer a3 Represented by the Following Formula (G9)

[Chemical formula 31]

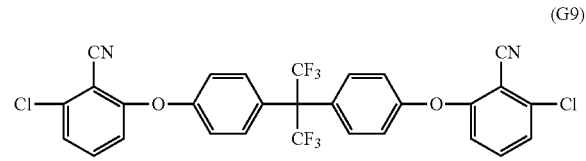

(G9)

To a 1 L three neck flask equipped with an agitator, a thermometer, a cooling tube, a Dean-Stark tube, and a nitrogen gas inlet tube, there were weighed 49.4 g (0.29 mol) of 2,6-dichlorobenzonitrile, 88.4 g (0.26 mol) of 2,2-bis(4-hydroxyphenyl)-1,1,1,3,3,3-hexafluoropropane, and 47.3 g (0.34 mol) of potassium carbonate.

After nitrogen purge, there were further added 346 mL of sulfolane and 173 mL of toluene for agitation of the mixture. The flask was immersed in an oil bath and the content was heated and refluxed at 150° C. When the reaction was performed while the water caused by the reaction was subjected to azeotrope with toluene and was removed outside the system via the Dean-Stark tube, the generation of water became unable to be confirmed in about 3 hours. After removal of most of the toluene by gradually increasing the reaction temperature, the reaction was continued at 200° C. for 3 hours. Next, 12.3 g (0.072 mol) of 2,6-dichlorobenzonitrile was added and the reaction was further performed for 5 hours.

After thus obtained reaction liquid was allowed to stand for cooling, 100 mL of toluene was added thereto and the liquid was diluted. The precipitate of by-product inorganic compounds was removed by filtration, and the filtrate was charged into 2 L of methanol. The precipitated product was filtered, collected and dried, which was then dissolved in 250 mL of tetrahydrofuran. The mixture was reprecipitated in 2 L of methanol, and thus 107 g of the target oligomer a3 was obtained. The number-average molecular weight of the oligomer a3 was 7,400.

Synthesis Example 7

Synthesis of Hydrophilic Monomer a4 Represented by the Following Formula (G10)

[Chemical formula 32]

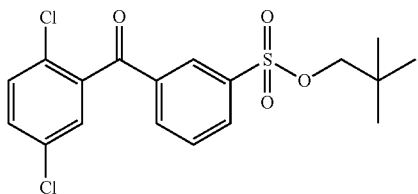

(G10)

To a 3 L three neck flask equipped with an agitator and a cooling tube, there were added 233.0 g (2 mol) of chlorosulfonic acid, and then 100.4 g (400 mmol) of 2,5-dichlorobenzophenone. The mixture was caused to react in a 100° C. oil bath for 8 hours. After a predetermined time, the reaction liquid was gradually poured in 1,000 g of crushed ice, and extraction was performed with ethyl acetate. The organic layer was rinsed with solution of sodium chloride, followed by drying with magnesium sulfate, then the ethyl acetate was distilled out, and thus a light yellow crude crystal of 3-(2,5-dichlorobenzoyl)benzenesulfonyl chloride was obtained. The crude crystal was used as is without purification, at the next step.

38.8 g (440 mmol) of 2,2-dimethyl-1-propanol (neopenthyl alcohol) was added to 300 mL of pyridine, and the resultant mixture was cooled to about 10° C. The above-obtained crude crystal was gradually added to the cooled mixture for about 30 minutes. After the addition of the entire crude crystal, the mixture was further agitated for 30 minutes and caused to react. After reaction, the reaction liquid was poured in 1000 mL of hydrochloric acid aqueous solution, and the deposited solid was collected. Thus obtained solid was dissolved in ethyl acetate, was rinsed with aqueous solution of sodium hydrogencarbonate and solution of sodium chlorid, followed by drying with magnesium sulfate, then the ethyl acetate was distilled out, and thus a crude crystal was obtained. The crude crystal was recrystallized with methanol, and a white crystal of 3-(2,5-dichlorobenzoyl)benzenesulfonic acid neopentyl ester a4 represented by the above structural formula was obtained.

Synthesis Example 8

Synthesis of Polyarylene-Based Block Copolymer b3 Represented by the Following Formula (G11)

[Chemical formula 33]

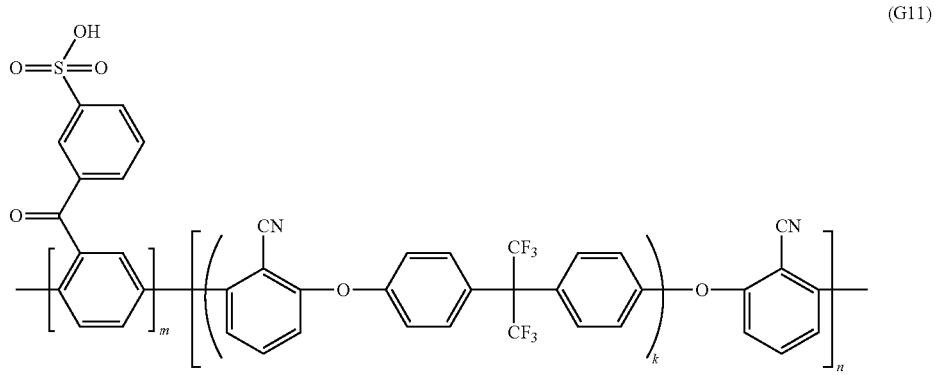

(G11)

166 mL of dried N,N-dimethylacetamide (DMAc) was added, in nitrogen atmosphere, to a 1 L of three neck flask equipped with an agitator, a thermometer, and a nitrogen gas inlet tube, containing a mixture of 13.4 g (1.8 mmol) of hydrophobic oligomer (a3) synthesized in Synthesis Example 6, 37.6 g (93.7 mmol) of 3-(2,5-dichlorobenzoyl)benzenesulfonic acid neopentyl ester synthesized in Synthesis Example 7, 2.62 g (4.0 mmol) of bis(triphenylphosphine) nickel dichloride, 10.5 g (40.1 mmol) of triphenylphosphine, 0.45 g (3.0 mmol) of sodium iodide, and 15.7 g (240.5 mmol) of zinc.

The reaction system was heated under agitation (ultimately heated to a temperature of 82° C.), and caused to react for 3 hours. During the reaction period, the viscosity increase in the reaction system was observed. The polymerized solution was diluted with 175 mL of DMAc, the resultant solution was agitated for 30 minutes, and after that, the reaction mixture was filtered using Celite as the filter aid. Using a 1 L three neck flask equipped with an agitator, 24.4 g (281 mmol) of lithium bromide was added to the filtrate three times (each one third of aliquot part) with an interval of 1 hour. The resultant mixture was caused to react at 120° C. for 5 hours in nitrogen atmosphere. After the reaction, the mixture was cooled to room temperature, and the mixture was poured in 4 L of acetone for solidification. The solidified product was coagulated and air-dried, followed by crushing in a mixer, and the resultant substance was rinsed with 1500 mL of 1N sulfuric acid under agitation. After filtration, the product was rinsed with ion-exchange water until the pH of the rinsing liquid became 5 or larger. Then, the product was dried at 80° C. overnight, and thus 38.0 g of the target block copolymer b3 was obtained. The weight-average molecular weight of the block copolymer was 180,000.

When the block copolymer b3 itself was the polymer electrolyte membrane, the ion-exchange capacity obtained by the neutralization titration was 2.5 meq/g.

Synthesis Example 9 CL (Synthesis of Polyketalketone (PKK)-Based Random Copolymer r1 Represented by the Following Formula (G12)

[Chemical formula 34]

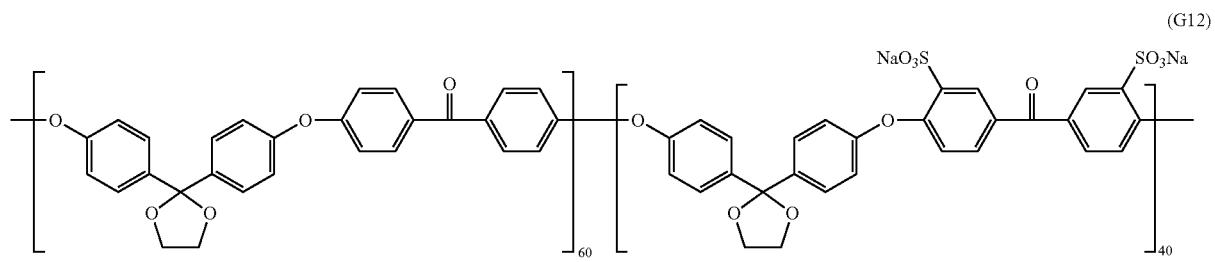

(G12)

To a 500 mL three neck flask equipped with an agitator, a nitrogen gas inlet tube, and a Dean-Stark trap, there were added 13.82 g of potassium carbonate (Aldrich reagent, 100 mmol), 20.4 g (80 mmol) of a mixture of K-DHBP obtained in Synthesis Example 1 and DHBP, (K-DHBP/DHBP=94/6 (mol %)), 10.5 g of 4,4'-difluorobenzophenone (Aldrich reagent, 48 mmol), and 13.5 g (32 mmol) of disodium 3,3'-disulfonate-4,4'-difluorobenzophenone obtained in Synthesis Example 2. After nitrogen purge, the resultant content was dewatered at 180° C. in 90 mL of N-methylpyrrolidone (NMP) and 45 mL of toluene, and then the resultant mixture was heated and the toluene was removed, and polymerization was performed at 230° C. for 10 hours. Purification of the reaction product was performed by reprecipitation through the use of a large volume of water, and thus there was obtained the random copolymer r1 represented by the general formula (G12). The weight-average molecular weight was 300,000.

When the random copolymer r1 was formed to the polymer electrolyte membrane, the ion-exchange capacity obtained by the neutralization titration was 1.8 meq/g. No residual ketal group was able to be confirmed.

Example 1

A 20 g of the block copolymer b1 obtained in Synthesis Example 3 was dissolved in 80 g of NMP. 200 mg of 1,2-bis(diphenylphosphino) ethane (DPPE, manufactured by Aldrich) was added to the solution, then the mixture was agitated for 3 minutes using an agitator at 20,000 rpm and a transparent solution of 20% by mass of polymer was obtained. The solution was pressure-filtered using a glass fiber filter, followed by flow-casting coating on a glass plate. After drying at 100° C. for 4 hours, the coating was heat-treated under nitrogen atmosphere at 150° C. for 10 minutes and the polyketalketone membrane (15 μm of membrane thickness) was obtained. The solubility of the polymer was extremely good. The membrane was immersed at 95° C. for 24 hours in an aqueous solution of 10% by weight of sulfuric acid for proton substitution and deprotection reaction, and then the membrane was immersed for 24 hours in a large excessive volume of pure water for full rinsing, and thus the polymer electrolyte membrane f1 was obtained.

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity (IEC), and the result is shown in Table 1.

Example 2

The electrolyte membrane f2 was manufactured by the same procedure as that of Example 1 except that the amount of 1,2-bis(diphenylphosphino)ethane (DPPE) was changed to 7 g.

Since the obtained membrane was insoluble in NMP, the molecular weight holding rate was not able to be measured, and thus the open circuit holding time was measured as the durability test. However, the evaluation was not completed within 3,000 hours, and thus the chemical durability of the electrolyte membrane was evaluated as the voltage holding rate. Separately, there were measured the proton conductivity at 80° C. and 25% RH and the ion-exchange capacity (IEC), and the result is shown in Table 1.

Example 3

The electrolyte membrane f3 was manufactured by the same procedure as that of Example 1 except that the amount of DPPE was changed to 4 mg.

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Example 4

The electrolyte membrane f4 was manufactured by the same procedure as that of Example 1 except that the block copolymer b1 was changed to Nafion (registered trademark) NRE211CS which is a fluorine-based electrolyte.

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Example 5

The electrolyte membrane f5 was manufactured by the same procedure as that of Example 1 except that the block copolymer b1 was changed to the PES-based block copolymer b2.

Since the obtained membrane was soluble in NMP, the molecular weight holding rate was measured as the durability test. Separately, there were measured the proton conductivity at 80° C. and 25% RH and the ion-exchange capacity, and the result is shown in Table 1.

Example 6

The electrolyte membrane f6 was manufactured by the same procedure as that of Example 1 except that the block copolymer b1 was changed to the polyarylene-based block copolymer b3.

Since the obtained membrane was soluble in NMP, the molecular weight holding rate was measured as the durability test. Separately, there were measured the proton conductivity at 80° C. and 25% RH and the ion-exchange capacity, and the result is shown in Table 1.

Example 7

The electrolyte membrane f7 was manufactured by the same procedure to that of Example 1 except that the DPPE was changed to triphenylphosphine (TPP, manufactured by Aldrich).

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Example 8

The electrolyte membrane f8 was manufactured by the same procedure as that of Example 1 except that the DPPE was changed to 1,2-bis(dicyclohexylphosphino)ethane (DCHPE, manufactured by Aldrich).

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Example 9

The electrolyte membrane f9 was manufactured by the same procedure as that of Example 1 except that the DPPE was changed to bis(2-diphenylphosphinoethyl)phenylphosphine (DPPEPP, manufactured by Aldrich).

Since the obtained membrane was insoluble in NMP, the molecular weight holding rate was not able to be measured, and thus the open circuit holding time was measured as the durability test. However, the evaluation was not completed within 3,000 hours, and thus the chemical durability of the electrolyte membrane was evaluated as the voltage holding rate. Separately, there were measured the proton conductivity at 80° C. and 25% RH and the ion-exchange capacity, and the result is shown in Table 1.

Example 10

Synthesis of Complex of DPPE and Cerium Nitrate (III)

There were added 3 g (7.53 mmol) of DPPE and 817 mg (1.88 mmol) of cerium nitrate hexahydrate, to a 100 mL eggplant-shape flask. 60 mL of ethanol was poured to the mixture, and the mixture was agitated at 25° C. for 24 hours. The white suspension was concentrated in a rotary evaporator and the solvent was removed. Thus obtained white solid was used as is as the additive, without purification.

(Manufacture of Polymer Electrolyte Membrane f10 Containing DPPE-Cerium Complex (DPPE-Ce))

The electrolyte membrane f10 was manufactured by the same procedure as that of Example 1 except that the DPPE was changed to DPPE-Ce.

Since the obtained membrane was insoluble in NMP, the molecular weight holding rate was not able to be measured, and thus the open circuit holding time was measured as the durability test. However, the evaluation was not completed within 3,000 hours, and thus the chemical durability of the electrolyte membrane was evaluated as the voltage holding rate. Separately, there were measured the proton conductivity at 80° C. and 25% RH and the ion-exchange capacity, and the result is shown in Table 1.

Example 11

The electrolyte membrane f11 was manufactured by the same procedure as that of Example 1 except that the DPPE was changed to [1,2-bis(diphenylphosphino)ethane]dichloropalladium (II) (DPPE-Pd, manufactured by Aldrich).

Since the obtained membrane was insoluble in NMP, the molecular weight holding rate was not able to be measured, and thus the open circuit holding time was measured as the durability test. However, the evaluation was not completed within 3,000 hours, and thus the chemical durability of the electrolyte membrane was evaluated as the voltage holding rate. Separately, there were measured the proton conductivity at 80° C. and 25% RH and the ion-exchange capacity, and the result is shown in Table 1.

Example 12

The electrolyte membrane f12 was manufactured by the same procedure as that of Example 1 except that the DPPE was changed to dichloro[(R)-(+)-2,2'-bis(diphenylphosphino)-1,1'-binaphthyl]ruthenium (II) (BINAP-Ru, manufactured by Aldrich).

Since the obtained membrane was insoluble in NMP, the molecular weight holding rate was not able to be measured, and thus the open circuit holding time was measured as the durability test. However, the evaluation was not completed within 3,000 hours, and thus the chemical durability of the electrolyte membrane was evaluated as the voltage holding rate. Separately, there were measured the proton conductivity at 80° C. and 25% RH and the ion-exchange capacity, and the result is shown in Table 1.

Example 13

The electrolyte membrane f13 was manufactured by the same procedure as that of Example 1 except that the DPPE was changed to bis(gold(I)chloride)1,3-bis(diphenylphosphino)propane (DPPP-Au, manufactured by Aldrich).

Since the obtained membrane was insoluble in NMP, the molecular weight holding rate was not able to be measured, and thus the open circuit holding time was measured as the durability test. However, the evaluation was not completed within 3,000 hours, and thus the chemical durability of the electrolyte membrane was evaluated as the voltage holding rate. Separately, there were measured the proton conductivity at 80° C. and 25% RH and the ion-exchange capacity, and the result is shown in Table 1.

Example 14

The electrolyte membrane f14 was manufactured by the same procedure as that of Example 1 except that the DPPE was changed to trichloro[1,1,1-tris(diphenylphosphinomethyl)ethane]rhodium (III) (TDPPME-Rh, manufactured by Aldrich).

Since the obtained membrane was insoluble in NMP, the molecular weight holding rate was not able to be measured, and thus the open circuit holding time was measured as the durability test. However, the evaluation was not completed within 3,000 hours, and thus the chemical durability of the electrolyte membrane was evaluated as the voltage holding rate. Separately, there were measured the proton conductivity at 80° C. and 25% RH and the ion-exchange capacity, and the result is shown in Table 1.

Example 15

The electrolyte membrane f15 was o manufactured by the same procedure as that of Example 1 except that the DPPE was changed to diphenylmethoxyphosphine (manufactured by Aldrich).

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Example 16

The electrolyte membrane f16 was manufactured by the same procedure as that of Example 1 except that the block copolymer b1 was changed to the random copolymer r1.

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Comparative Example 1

The electrolyte membrane f1' manufactured by the same procedure as that of Example 1 except that the DPPE was not used.

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Comparative Example 2

The electrolyte membrane f2' was manufactured by the same procedure as that of Example 4 except that the DPPE was not used.

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Comparative Example 3

The electrolyte membrane f3' was manufactured by the same procedure as that of Example 5 except that the DPPE was not used.

Since the obtained membrane was soluble in NMP, the molecular weight holding rate was measured as the durability test. Separately, there were measured the proton conductivity at 80° C. and 25% RH and the ion-exchange capacity, and the result is shown in Table 1.

Comparative Example 4

The electrolyte membrane f4' was o manufactured by the same procedure as that of Example 6 except that the DPPE was not used.

Since the obtained membrane was soluble in NMP, the molecular weight holding rate was measured as the durability test. Separately, there were measured the proton conductivity at 80° C. and 25% RH and the ion-exchange capacity, and the result is shown in Table 1.

Comparative Example 5

The electrolyte membrane f5' was manufactured by the same procedure as that of Example 1 except that the DPPE was changed to diphenylphosphite (manufactured by Hokko Chemical Industry Co., Ltd.)

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Comparative Example 6

The electrolyte membrane f6' was manufactured by the same procedure as that of Example 1 except that the DPPE was changed to tetraphenylphosphonium-tetraphenylborate (manufactured by Hokko Chemical Industry Co., Ltd.)

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

Comparative Example 7

The electrolyte membrane f7' was manufactured by the same procedure as that of Example 16 except that the DPPE was not used.

Since the obtained membrane was insoluble in NMP, the molecular weight holding rate was not able to be measured, and thus the open circuit holding time was measured as the durability test. Separately, there were measured the proton conductivity at 80° C. and 25% RH and the ion-exchange capacity, and the result is shown in Table 1.

TABLE 1

| | IEC (meq/g) | H+ conductivity (mS/cm) | Hot water resistance (%) | Open circuit holding time (hrs) | Voltage holding rate (%) | Molecular weight holding rate (%) |
|---|---|---|---|---|---|---|
| Example 1 | 1.65 | 2.3 | 90 | 2780 | — | — |
| Example 2 | 1.10 | 1.2 | 99 | 3000< | 97 | — |
| Example 3 | 1.79 | 3.0 | 80 | 2210 | — | — |
| Example 4 | 0.88 | 1.9 | 93 | 190 | — | — |
| Example 5 | 1.80 | 1.8 | 85 | — | — | 88 |
| Example 6 | 2.20 | 2.0 | 88 | — | — | 91 |
| Example 7 | 1.64 | 2.2 | 82 | 2170 | — | — |
| Example 8 | 1.65 | 2.3 | 88 | 2730 | — | — |
| Example 9 | 1.62 | 2.0 | 91 | 3000< | 80 | — |
| Example 10 | 1.57 | 1.8 | 82 | 3000< | 87 | — |
| Example 11 | 1.59 | 1.9 | 83 | 3000< | 88 | — |
| Example 12 | 1.60 | 1.9 | 89 | 3000< | 91 | — |
| Example 13 | 1.58 | 1.8 | 79 | 3000< | 84 | — |
| Example 14 | 1.58 | 1.8 | 85 | 3000< | 93 | — |
| Example 15 | 1.67 | 2.4 | 88 | 2540 | — | — |
| Example 16 | 1.66 | 0.3 | 88 | 2240 | — | — |
| Comparative Example 1 | 1.80 | 3.0 | — | 1400 | — | — |
| Comparative Example 2 | 0.92 | 2.5 | — | 100 | — | — |
| Comparative Example 3 | 2.01 | 2.3 | — | — | — | 60 |
| Comparative Example 4 | 2.45 | 2.6 | — | — | — | 65 |
| Comparative Example 5 | 1.70 | 2.6 | 57 | 1540 | — | — |
| Comparative Example 6 | 1.73 | 2.7 | 31 | 1480 | — | — |
| Comparative Example 6 | 1.80 | 0.5 | — | 1130 | — | — |

Table 1 shows that the open circuit holding time is longer in Examples 1 to 3, and 7 to 15, which added the phosphorus-containing additive (B), than in Comparative Example 1 which used the same polymer to that of these Examples. Among them Examples, extremely excellent chemical durability of longer than the period of 3,000 hours was given in: Example 2 which added 35% by mass of DPPE; Example 9 which used trifunctional phosphine; and Examples 10 to 14, which used a complex of polyfunctional phosphine and transition metal ion. Also for the respective pairs of Example 4 and Comparative Example 2, Example 5 and Comparative Example 3, Example 6 and Comparative Example 4, and Example 16 and Comparative Example 7, the one with addition of additive gave superior open circuit holding time or molecular weight holding rate. Consequently, the phosphine-based additive of the present invention can provide the polymer electrolyte membrane with excellent durability to hydrogen peroxide or peroxide radical, generated by power generation of fuel cell.

For Examples 1 to 3, Examples 7 to 15, and Example 16, they have superior open circuit holding time and hot water resistance to those of Comparative Examples 5 and 6. Since phosphite and phosphonium have high hydrophilicity and are eluted in water yielded during power generation, the phosphine and the phosphinite, having higher water resistance, can provide the polymer electrolyte membrane with excellent durability to the hydrogen peroxide or peroxide radical, yielded during power generation of fuel cell.

INDUSTRIAL APPLICABILITY

The polymer electrolyte composition and the polymer electrolyte membrane according to the present invention are applicable to various electrochemical apparatus such as fuel cell, water electrolyzer, and chloroalkali electrolyzer. Among them apparatus, the use in fuel cell is preferred, and specifically suitable use is for fuel cell utilizing hydrogen as the fuel.

The uses of the polymer electrolyte fuel cell of the present invention are not specifically limited, and preferred uses are: substitution of conventional primary battery or rechargeable battery; and hybrid power sources therewith. These preferred uses include: handy equipment such as cell phone, personal computer, PDA, video camera, and digital camera; household electric appliances such as cordless vacuum cleaner; toys; power source of vehicle such as motor bicycle, motorbike, automobile, bus, and truck; power source of mobile body such as ship and railway; and stationary power generator.

The invention claimed is:

1. A polymer electrolyte composition comprising at least an ionic group-containing polymer (A) and a phosphorus-containing additive (B), the phosphorus-containing additive (B) comprising a phosphine compound and/or a phosphinite compound, wherein the phosphine compound and/or the phosphinite compound comprises a total of two or more of at least one kind of group selected from a phosphine group and a phosphinite group.

2. The polymer electrolyte composition according to claim 1, wherein the content of the phosphorus-containing additive (B) is 0.02% by weight or more and 35% by weight or less relative to the total polymer electrolyte composition.

3. The polymer electrolyte composition according to claim 1, further comprising at least one transition metal selected from the group consisting of Ce, Mn, Ti, Zr, V, Cr, Mo, W, Ru, Co, Rh, Ir, Ni, Pd, Pt, Ag, and Au.

4. The polymer electrolyte composition according to claim 1, wherein the ionic group-containing polymer (A) comprises a hydrocarbon-based polymer having an aromatic ring in the main chain.

5. The polymer electrolyte composition according to claim 1, wherein the ionic group-containing polymer (A) comprises a block copolymer containing one or more of each of a segment (A1) containing an ionic group and a segment (A2) not containing an ionic group.

6. The polymer electrolyte composition according to claim 5, wherein the segment (A1) containing an ionic group and/or the segment (A2) not containing an ionic group comprises an aromatic polyetherketone-based polymer.

7. The polymer electrolyte composition according to claim 5, wherein segment (A1) containing an ionic group and the segment (A2) not containing an ionic group contains a constituent unit represented by general formulae (S1) and (S2), respectively:

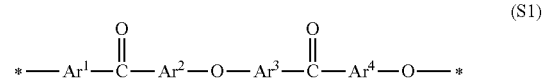

(S1)

where, in the general formula (S1), $Ar^1$ to $Ar^4$ each represent an arbitrary divalent arylene group; $Ar^1$ and/or $Ar^2$ contains an ionic group; $Ar^3$ and $Ar^4$ may or may not contain an ionic group; $Ar^1$ to $Ar^4$ may each be arbitrarily substituted, and may independently be two or more kinds of arylene group; and the symbol * signifies a bond moiety with the general formula (S1) or with other constituent unit,

[Chemical formula 2]

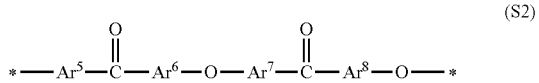

(S2)

where, in the general formula (S2), $Ar^5$ to $Ar^8$ each represent an arbitrary divalent arylene group and may each be arbitrarily substituted, but do not contain an ionic group; $Ar^5$ to $Ar^8$ may each independently be two or more kinds of arylene group; and the symbol * signifies a bond moiety with the general formula (S2) or with other constituent unit.

8. The polymer electrolyte composition according to claim 1, wherein the ionic group is a sulfonic acid group.

9. A polymer electrolyte membrane comprising the polymer electrolyte composition according to claim 1.

10. A membrane electrode assembly comprising the polymer electrolyte composition according to claim 1.

11. A polymer electrolyte fuel cell comprising the polymer electrolyte composition according to claim 1.

12. The polymer electrolyte composition according to claim 6, wherein segment (A1) containing an ionic group and the segment (A2) not containing an ionic group contains a constituent unit represented by general formulae (S1) and (S2), respectively:

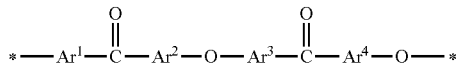

(S1)

where, in the general formula (S1), $Ar^1$ to $Ar^4$ each represent an arbitrary divalent arylene group; $Ar^1$ and/or $Ar^2$ contains an ionic group; $Ar^3$ and $Ar^4$ may or may not contain an ionic group; $Ar^1$ to $Ar^4$ may each be arbitrarily substituted, and may independently be two or more kinds of arylene group; and the symbol * signifies a bond moiety with the general formula (S1) or with other constituent unit,

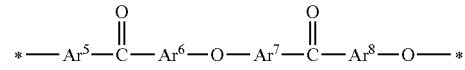

(S2)

where, in the general formula (S2), $Ar^5$ to $Ar^8$ each represent an arbitrary divalent arylene group and may each be arbitrarily substituted, but do not contain an ionic group; $Ar^5$ to $Ar^8$ may each independently be two or more kinds of arylene group; and the symbol * signifies a bond moiety with the general formula (S2) or with other constituent unit.

13. The polymer electrolyte composition according to claim 12, wherein the ionic group is a sulfonic acid group.

14. A polymer electrolyte membrane comprising the polymer electrolyte composition according to claim 12.

15. A membrane electrode assembly comprising the polymer electrolyte composition according to claim 12.

16. A polymer electrolyte fuel cell comprising the polymer electrolyte composition according to claim 12.

17. A polymer electrolyte composition comprising at least an ionic group-containing polymer (A) and a phosphorus-containing additive (B), the phosphorus-containing additive (B) comprising a phosphine compound and a phosphinite compound, wherein the phosphine compound and the phosphinite compound comprise a total of two or more of at least one kind selected from a phosphine group and a phosphinite group.

18. The polymer electrolyte composition according to claim 17, wherein the content of the phosphorus-containing additive (B) is 0.02% by weight or more and 35% by weight or less relative to the total polymer electrolyte composition.

19. The polymer electrolyte composition according to claim 17, further comprising at least one transition metal selected from the group consisting of Ce, Mn, Ti, Zr, V, Cr, Mo, W, Ru, Co, Rh, Ir, Ni, Pd, Pt, Ag, and Au.

* * * * *